(12) United States Patent
Eastman

(10) Patent No.: US 11,972,385 B2
(45) Date of Patent: *Apr. 30, 2024

(54) DRONE DELIVERY SYSTEMS AND METHODS

(71) Applicant: James Lawrence Eastman, Sunnyvale, TX (US)

(72) Inventor: James Lawrence Eastman, Sunnyvale, TX (US)

(73) Assignee: James Lawrence Eastman, Sunnyvale, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/707,234

(22) Filed: Mar. 29, 2022

(65) Prior Publication Data

US 2022/0327466 A1    Oct. 13, 2022

Related U.S. Application Data

(63) Continuation of application No. 17/226,654, filed on Apr. 9, 2021, now Pat. No. 11,379,784.

(51) Int. Cl.
*G06Q 10/083*    (2023.01)
*B64C 39/02*    (2023.01)
(Continued)

(52) U.S. Cl.
CPC ......... *G06Q 10/083* (2013.01); *B64C 39/024* (2013.01); *B64U 10/13* (2023.01); *B64U 2101/60* (2023.01)

(58) Field of Classification Search
CPC ...... G06Q 10/083; G06Q 50/40; G06Q 50/60; B64C 39/024; B64U 10/13; B64U 2101/60
See application file for complete search history.

(56) References Cited

U.S. PATENT DOCUMENTS 2,198,168 A    4/1940  Harris
4,776,141 A  * 10/1988  Powell .................. E04D 13/031
                                                                52/72
(Continued)

FOREIGN PATENT DOCUMENTS

CN    206984905 U    2/2018
CN    108346238 A    7/2018
(Continued)

OTHER PUBLICATIONS

McFarland, Matt, "UPS drivers may tag team deliveries with drones," CNN Wire Service, Atlanta, Feb. 20, 2017.*
(Continued)

*Primary Examiner* — Nathan Erb
(74) *Attorney, Agent, or Firm* — Seed IP Law Group LLP

(57) ABSTRACT

A drone delivery system for receiving a package on a roof of a structure includes a panel coupled to the roof that selectively provides access to an opening in the roof upon identification and authorization of an incoming package. Once the package is identified and authorized, the panel opens and the package is received from an aerial vehicle on a platform in the opening. The platform is lowered by a drive assembly and the panel is closed over the opening. The drive assembly then lowers the platform and package to an intended destination inside the structure.

14 Claims, 14 Drawing Sheets

(51) Int. Cl.
*B64U 10/13* (2023.01)
*B64U 101/60* (2023.01)

(56) References Cited

U.S. PATENT DOCUMENTS

| | | | |
|---|---|---|---|
| 6,035,999 A * | 3/2000 | Hall | B65G 13/075 |
| | | | 198/783 |
| 6,666,643 B1 * | 12/2003 | Heynssens | B60P 1/4435 |
| | | | 414/522 |
| 9,975,651 B1 | 5/2018 | Eck et al. | |
| 9,984,347 B2 | 5/2018 | Dreano, Jr. | |
| 10,112,712 B1 | 10/2018 | Gentry et al. | |
| 10,351,261 B1 * | 7/2019 | Bryant | B64F 1/32 |
| 10,377,507 B2 | 8/2019 | Tremblay et al. | |
| 10,501,205 B1 * | 12/2019 | Siewert | A47G 29/22 |
| 10,689,111 B2 | 6/2020 | von Gostomski et al. | |
| 10,730,621 B2 | 8/2020 | Goovaerts et al. | |
| 10,746,348 B2 | 8/2020 | Strahlendorf et al. | |
| 11,379,784 B1 * | 7/2022 | Eastman | B64C 39/024 |
| 2005/0205547 A1 * | 9/2005 | Wenzel | A21B 1/48 |
| | | | 219/388 |
| 2009/0169345 A1 | 7/2009 | Watanabe et al. | |
| 2014/0265754 A1 | 9/2014 | Patterson | |
| 2015/0158599 A1 | 6/2015 | Sisko | |
| 2016/0159496 A1 * | 6/2016 | O'Toole | A47G 29/141 |
| | | | 244/110 E |
| 2018/0225628 A1 | 8/2018 | Roy | |
| 2019/0043007 A1 | 2/2019 | Staton et al. | |
| 2019/0135433 A1 | 5/2019 | Goovaerts et al. | |
| 2019/0152701 A1 * | 5/2019 | Eck | B65G 67/24 |
| 2019/0300202 A1 | 10/2019 | High et al. | |
| 2020/0198801 A1 * | 6/2020 | Carthew | B64F 1/00 |
| 2021/0010315 A1 | 1/2021 | Honjo et al. | |
| 2021/0049858 A1 | 2/2021 | Huntley et al. | |

FOREIGN PATENT DOCUMENTS

| | | |
|---|---|---|
| WO | 2018/071943 A1 | 4/2018 |
| WO | 2020/118552 A1 | 6/2020 |

OTHER PUBLICATIONS

McFarland, Matt, "UPS drivers may tag team deliveries with drones," CNN Wire Service, CNN Newsource Sales, Inc., Atlanta, Feb. 20, 2017.

* cited by examiner

US 11,972,385 B2

DRONE DELIVERY SYSTEMS AND METHODS

CROSS REFERENCE TO RELATED APPLICATION

This application is a continuation of U.S. patent application Ser. No. 17/226,654 filed on Apr. 9, 2021, the entire contents of which are hereby incorporated by reference.

BACKGROUND

Technical Field

The present disclosure generally relates to drone delivery systems and methods.

Description of the Related Art

Unmanned aerial vehicles or drones are known. Recently, the concept of delivering packages with drones has been explored as an alternative to using trucks or vans to perform last mile delivery from a warehouse to a final destination of the package. However, package theft is also a known issue with package delivery, regardless of the type of vehicle used in the delivery. In other words, a package delivered by a drone to a customer's front door is as susceptible to package theft as typical truck or van delivery. There are also concerns with how packages are verified for delivery to the correct customer in large-scale drone delivery applications. There has been some research with respect to drone delivery systems that are integrated into structures, but such systems require significant structural changes for implementation and do not have an aesthetically pleasing design, which limits their applicability and adoptability for widespread use.

BRIEF SUMMARY

Embodiments described herein provide devices and systems for delivery of packages with drones and include a system that can be integrated into an existing structure with minimal structural changes and an aesthetically pleasing appearance. Related methods are also provided.

One or more embodiments of a drone delivery system may be summarized as including: an access panel coupled to a structural support of a building, the access panel configured to selectively provide access to an opening in the structural support; a platform movably positionable within an internal space of the building; a drive assembly coupled to the platform, the drive assembly configured to move the platform within the internal space of the building between a plurality of positions relative to the structural support; and a controller in electronic communication with the access panel and the drive assembly, the controller including a memory configured to store instructions and at least one processor configured to execute the instructions to detect an authorized incoming package from a delivery device, manipulate the access panel to provide access to the opening and expose the platform to an external environment, detect receipt of the package on the platform, activate the drive assembly to lower the platform, and manipulate the access panel to cover the opening, the access panel and the platform each at least partially formed of a transparent or translucent material to allow natural light from the external environment to enter the internal space of the building.

The system may further include: the platform including a frame, a package support plate and a rail coupled to the frame and extending around the package support plate; the platform including an upper portion and a lower portion, the package support plate provided at the upper portion, the platform including a cable mounting arrangement at the lower portion; the cable mounting arrangement including a plurality of eyes coupled to or integrally formed with the lower portion of the platform; and the drive assembly including at least cable coupled to the plurality of eyes.

The system may further including: the opening being a first opening, the system further including at least one biasing element coupled to the structural support and configured to move a package received on the structural support proximate the panel toward the first opening, a shaft in the building in communication with the first opening and extending through at least one wall of the building, and a door coupled to the least one wall, the door configured to selectively provide access to a second opening in the at least one wall of the building in communication with the shaft; and the at least one processor being configured to execute further instructions to activate the drive assembly to lower the platform to the second opening, manipulate the door to provide access to the second opening, detect removal of the package from the platform, and manipulate the door to cover the second opening.

One or more embodiments of a drone delivery system may be summarized as including: an access panel coupled to a roof of a building and configured to selectively provide access to an opening in the roof; a first drive assembly coupled to the access panel and configured to move the access panel between a first position wherein the access panel restricts access to the opening and a second positon wherein the access panel allows access to the opening; a platform including a frame having an upper portion and a lower portion, the platform including a package support panel provided at the upper portion of the frame and a cable mounting arrangement provided at the lower portion of the frame; and a second drive assembly coupled to the platform including a drive and a plurality of cables coupled to the drive and the cable mounting arrangement of the platform, the second drive assembly configured to move the platform between a plurality of positions relative to the roof.

The system may further include: the access panel and the package support panel each being at least partially formed of a transparent or translucent material to allow natural light from an external environment to enter an internal space of the building; the first portion of the frame of the platform being an upper portion and the second portion of the frame of the platform being a lower portion, the frame of the platform supported at the lower portion by the plurality of cables with the first drive assembly further configured to position the frame in the opening and the package support panel at or above the roof; and a controller in electronic communication with the access panel and the second drive assembly, the controller including a memory configured to store instructions and at least one processor configured to execute the instructions to detect an authorized incoming package from a delivery device, manipulate the access panel to provide access to the opening, activate the second drive assembly to raise the platform to a first position wherein the platform is positioned in the opening, detect receipt of the package on the package support panel of the platform, activate the second drive assembly to lower the platform to a second position, and manipulate the access panel to cover the opening.

The system may further include: the opening being a first opening, the system further including at least one biasing element coupled to the roof and configured to move a package received on the roof toward the first opening, a shaft in the building in communication with the first opening and extending through at least one wall of the building, and a door coupled to the least one wall, the door configured to selectively provide access to a second opening in the at least one wall of the building in communication with the shaft; the at least one processor is configured to execute further instructions to activate the second drive assembly to lower the platform to the second opening, manipulate the door to provide access to the second opening, detect removal of the package from the package support panel of the platform, and manipulate the door to cover the second opening; a housing coupled to the roof and the access panel, the access panel configured to slide in and out of the housing; and the access panel including a first door and a second door, the first and second doors rotatably coupled to the roof and configured to rotate between an open position and a closed position to selectively provide access to the opening.

One or more embodiments of a drone delivery method may be summarized as including: detecting an incoming package from a delivery device; authorizing the incoming package; manipulating an access panel coupled to a roof to provide access to an opening in the roof; activating a drive assembly to raise a package receiving platform coupled to the drive assembly to a first position wherein the package receiving platform is positioned in the opening with a package support plate of the package receiving platform planar with at least a portion of the roof to receive the package on the package support plate; detecting receipt of the package on the package receiving platform; activating the drive assembly to lower the package receiving platform; and manipulating the access panel to cover the opening.

The method may further include: after manipulating the access panel to cover the opening, activating the drive assembly to lower the package receiving platform to a second opening, manipulating a door to provide access to a second opening in a wall of a building, detecting removal of the package from the package receiving platform, and manipulating the door to cover the second opening; manipulating the access panel coupled to the roof including sliding the access panel in and out of a housing coupled to the roof to selectively provide access to the opening; manipulating the access panel coupled to the roof including rotating a first door and a second door of the access panel to selectively provide access to the opening; and activating the drive assembly to raise the package receiving platform including activating a drive assembly to manipulate a plurality of cables of the drive assembly coupled to a bottom portion of the package receiving platform.

DETAILED DESCRIPTION

The present disclosure generally describes drone delivery systems and associated methods, including a system or device that is installed in a structure and authorizes an incoming drone for delivery, receives a package from a drone, and conveys the package to a drop off location within the structure. While the present disclosure will proceed with reference to a single-family house or an apartment building, it is to be appreciated that the concepts of the disclosure can be applied to any residential or commercial structure.

Figure 1A:
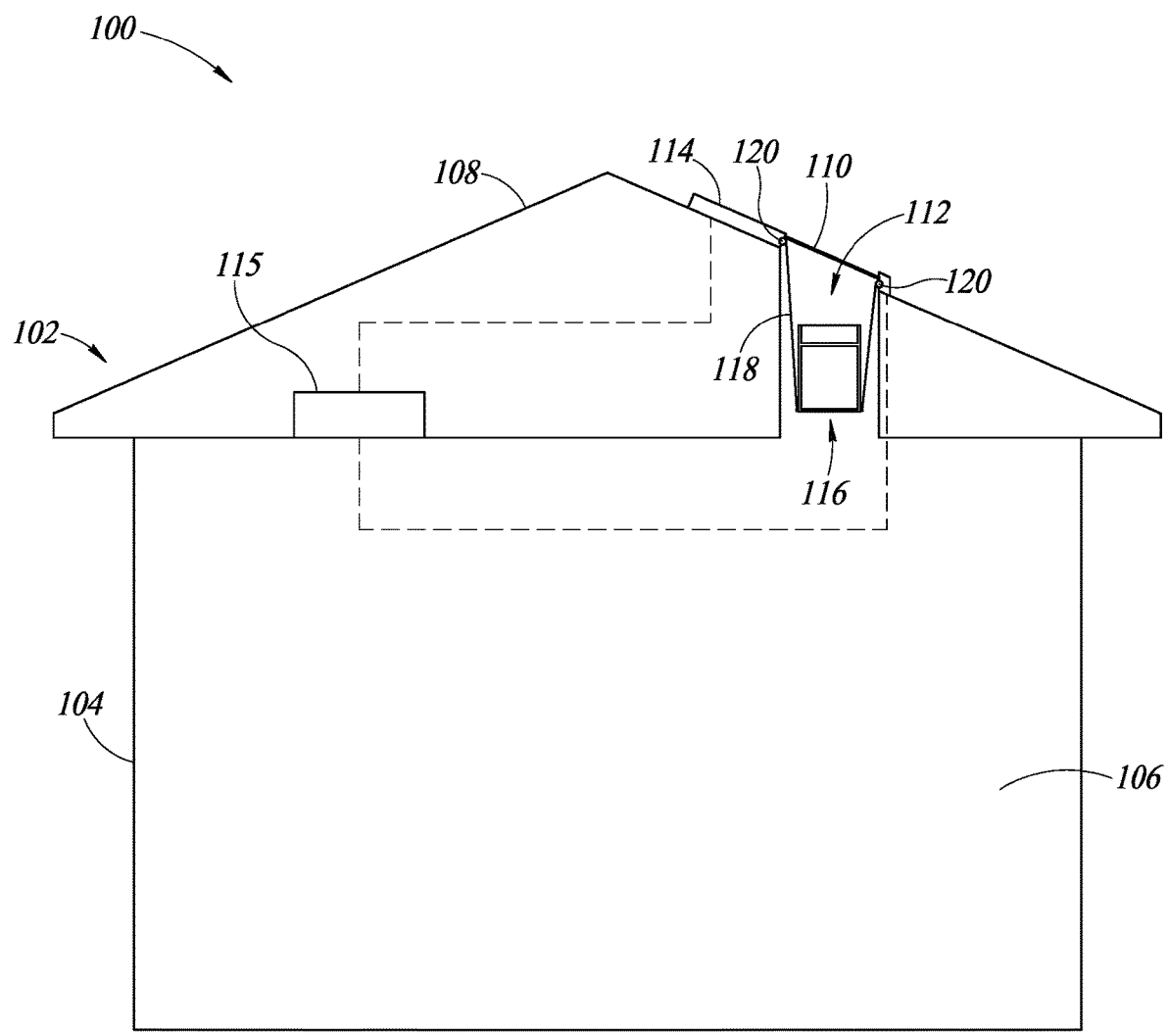
FIG. 1A is a schematic elevational view of an embodiment of a drone delivery system according to the present disclosure with a platform of the system in a first position.

FIG. 1A is a schematic view of a drone delivery system 100 installed in a structure 102. In FIG. 1A, the structure 102 is a house with walls 104, a living space 106, and a roof 108 coupled to the walls 104. The roof 108 and the walls 104 may also be referred to herein as structural supports of the structure 102. A panel 110 (which may also be referred to herein as an access panel 110) is coupled to the roof 108 and configured to selectively provide access to an opening 112 through the roof 108. In the illustrated embodiment, the system 100 further includes a housing 114 coupled to the roof 108 and structured to slidably receive the panel 110. In one non-limiting example, the housing 114 includes a motor and one or more rods coupled between a drive of the motor and the panel 110. When the motor is activated, as described herein, the motor rotates the drive, which extends or retracts the rods coupled to the panel 110 in order to slide the panel 110 in and out of the housing 114 to provide selective access to the opening 112. In some embodiments, the panel 110 and housing 114 are a conventional sunroof assembly adapted for use on the roof 108 of the structure 102. The motor may be an electric motor that receives power from a power supply and is selectively activated by a controller 115, which may be similar to controller 600 described with reference to FIG. 7.

The system 100 further includes a platform 116 coupled to the roof 108 by cables 118. The platform 116 will be described in greater detail with reference to FIG. 2. The cables 118 may be any commercially available cable, such as wire or rope in some embodiments. The cables 118 are coupled at one end to spools 120 and at the other end to the platform 116. In some embodiments, the spools 120 also include one or more pulleys downstream from the spools 120 that reduce tension in the cables 118. The spools 120 are coupled to the housing 114, wherein the housing 114 may include an additional motor and associated gear combination for rotating the spools 120 based on appropriate instructions from the controller. As such, the position of the platform 116 can be selectively adjusted by rotating the spools 120 to extend or retract the cables 120. In FIG. 1A, the platform 116 is positioned in the opening 112 in the roof 108 in a resting or inactive position. In other words, FIG. 1A illustrates a position of the platform 116 that corresponds to the system 100 being inoperative or not in use, which may also be referred to herein as a starting position or a first position. In the first position of the platform 116, the panel 110 is in the closed position. In the closed position, the panel 110 is fully extended from the housing 114 to cover the opening 112. Put differently, the panel 110 restricts access to the opening 112 in the closed position.

Figure 1B:
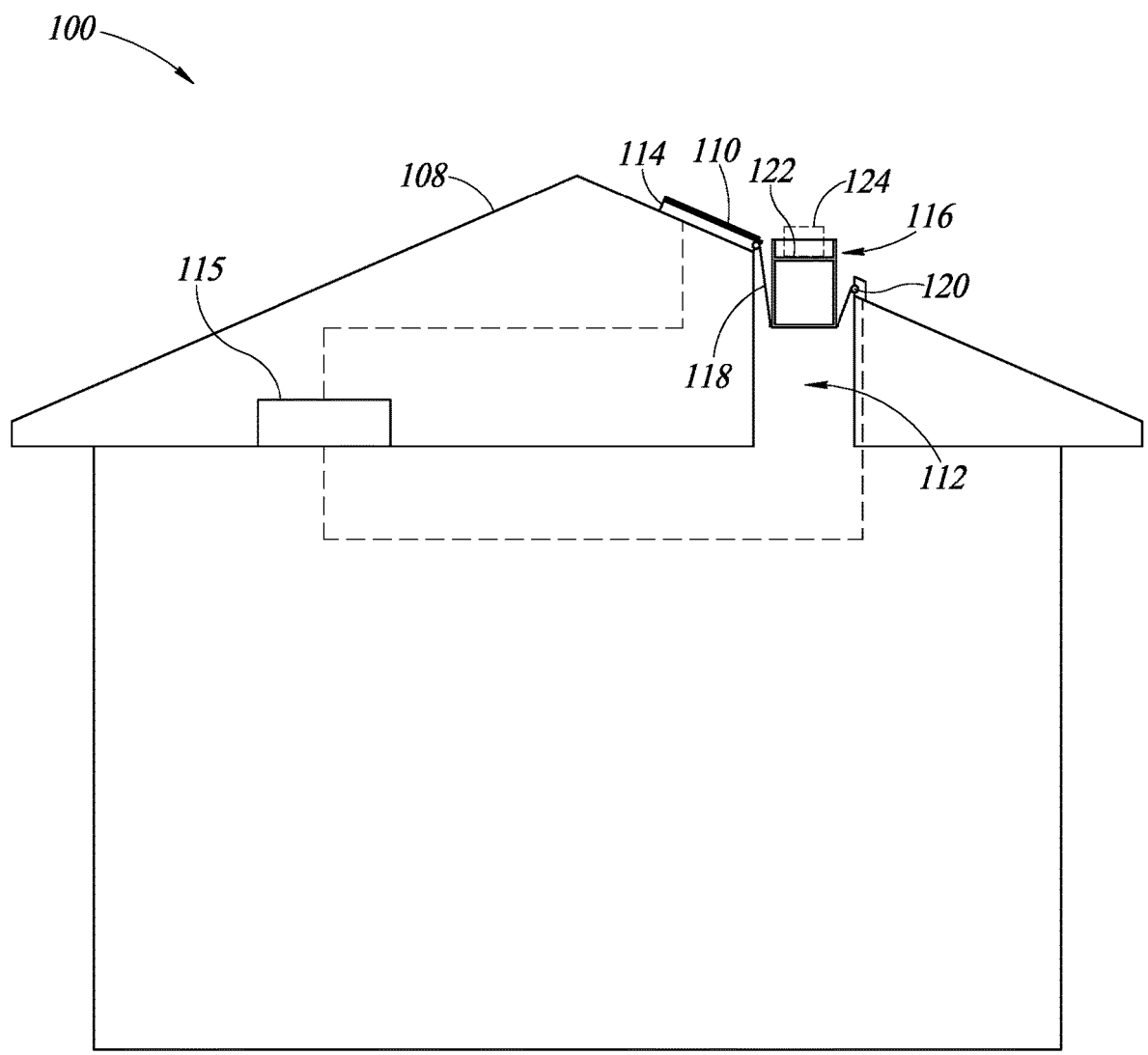
FIG. 1B is a schematic elevational view of the system of FIG. 1A with the platform in a second position.

FIG. 1B illustrates the system 100 with the platform 116 in a second position corresponding to activation of the system 100. With the platform 116 in the second position, the system 100 provides a flat surface for receiving a package 124 in order to account for a slope of the roof 108. Specifically, in FIG. 1B, the panel 110 is retracted into the housing 114 to provide access to the opening 112. Then, the controller provides an activation signal or instruction to the motor associated with the spools 120 to wind the spools 120 and retract the cables 118, which raises the platform 116 until the platform 116 is at or above the roof 108. More specifically, the platform 118 includes a plate 122 (which may also be referred to herein as a package support plate 122) for receiving the incoming package 124. In the second position, the plate 122 of the platform 116 is raised until the plate 122 is at or above the roof 108 in one or more embodiments. In other words, the plate 122 is planar with at least a portion of the roof 108 in the second position, meaning in this context only that a plane containing the plate 122 is coplanar with, or positioned above, a plane containing at least a portion of the roof 108. Once the platform 116 is in the second position shown in FIG. 1B, the platform 116 receives the package 124 from a drone on the plate 122. Thus, the system 100 accounts for the slope of the roof 108 by raising the platform 116 until the plate 122 is at or above the level of the roof, which provides a flat and secure surface for receiving the incoming package 124.

Figure 1C:
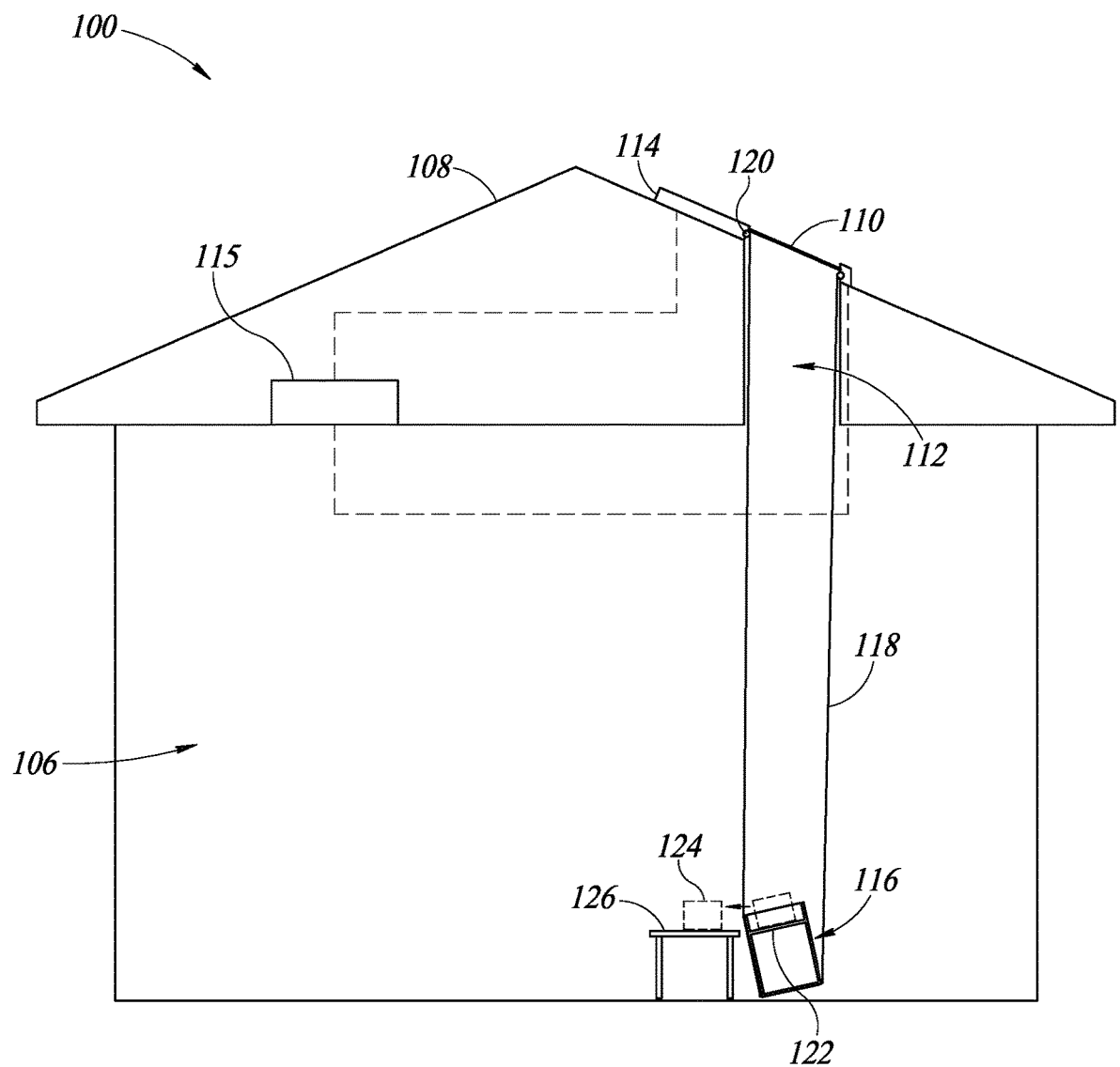
FIG. 1C is a schematic elevational view of the system of FIG. 1A with the platform in a third position for unloading a delivered package to a table.

FIG. 1C illustrates the system 100 in a third position after receiving the package 124. More specifically, after the system 100 receives the package 124 in FIG. 1B, the controller sends one or more signals or instructions to the motor associated with the panel 110 to extend the panel 110 from the housing 114 and restrict access to the opening 112. In other words, the panel 110 is manipulated from the open position in FIG. 1B to the closed position in FIG. 1C. Further, the controller sends one or more signals or instructions to the motor associated with the spools 120 to unwind the cables 118 from the spools 120 and lower the platform 116 from the roof 108 to the living space 106. The platform 116 is lowered until the platform 116 reaches a selected destination in the living space 106. In FIG. 1C, the platform 116 is lowered until the platform 116 is proximate a table 126 for receiving the package 124.

In some embodiments, the controller determines the amount of cable 118 to unwind from the spools 120 and the position of the platform 116 in the living space 106 based on predetermined or preset inputs to the controller. Alternatively, the system 100 may include one or more sensors, such as proximity sensors, in the living space 106 or on the platform 116 that communicate with the controller and send a signal to the controller to stop the motor associated with the spools 120 when the platform 116 is in the third position shown in FIG. 1C. The one or more sensors may provide the signals in response to the platform 116 being a detected distance from the table 126 or from the ground of the living space 106, among other like reference points.

As shown in the illustrated embodiment of FIG. 1C, the controller may instruct the system 100 to lower the platform 116 until the plate 122 of the platform 116 is approximately aligned or planar with the table 126. Then, the controller may send one or more signals or instructions to only one of the spools 120 or one set of spools 120 associated with a cable or cables 118 attached to only one side of the platform 116 to wind the corresponding spools 120 and raise one side of the platform 116, as shown. This process enables the platform 116 to offload the package 124 onto the table without further interaction from a user or additional components of the system 100. The plate 122 of the platform 116 may include a film, coating, or another like structure to reduce a coefficient of friction between the plate 122 and the package 124 such that the package 124 is able to slide off the plate 122 and onto the table 126 more easily, in one or more embodiments. In such embodiments, the system 100 may include sensors on the platform 116 on the table 126 for determining when the package 124 is offloaded from the platform 116, such as weight sensors or proximity sensors, among others. Once the controller determines, via the sensors, that the package 124 is offloaded from the platform 116, the controller activates the motor associated with the spools 120 to raise the platform 116 back to the first position. In other words, after the package 124 is offloaded as in FIG. 1C, the system 100 returns to the first position shown in FIG. 1A so that the platform 116 is prepared to receive one or more additional packages.

Alternatively, the system 100 may hold the platform 116 in the third position with the plate 122 flat and planar until a user removes the package 124 from the platform 116. In such embodiments, table 126 may be omitted and the system 100 will return to the first position once the controller detects that the package 124 is removed from the platform 116. In yet further embodiments, the system 100 sends a notification to a user once the platform 116 reaches the third position and the package is ready for retrieval. Then, once the user receives the package, the user provides a responsive input, such as through a control panel of the system 100 or via a mobile device, that the package 124 has been received and the platform 116 should be returned to the first position. Once the system 100 receives the responsive input from the user, the system 100 returns to the first position shown in FIG. 1A to receive one or more additional packages.

Figure 1D:
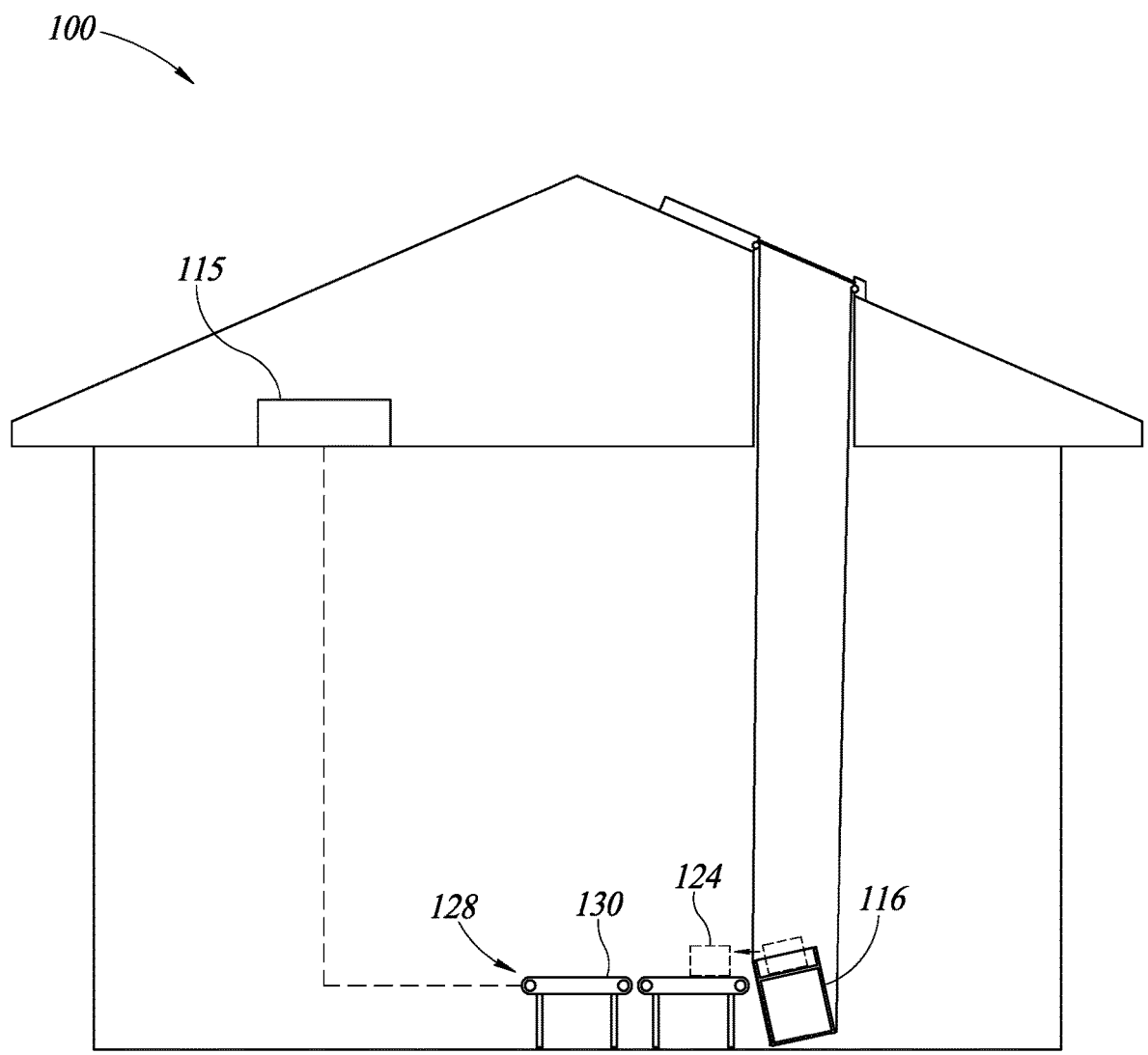
FIG. 1D is a schematic elevational view of the system of FIG. 1A with the platform in the third position for unloading the delivered package to a conveyor system.

FIG. 1D illustrates an embodiment of the system 100 in the third position shown in FIG. 1C with the table 126 replaced by a conveyor system 128. In FIG. 1D, the platform 116 is lowered to the third position and tilted to slide the package 124 off the platform 116 and onto the conveyor system 128. The conveyor system 128 may include one or more independent conveyors 130 aligned with each other and connected in series to transport the package 124 from the platform 116 to an intended final destination. The embodiment illustrated in FIG. 1D is useful in a house where a user has a designated package receiving area at the end of the conveyor system 128, such as a closet or chest. In addition, the system 100 can also be installed in a commercial or multi-family housing with conveyor system 128 transferring received packages to specific users based on identification information associated with the package 124.

Figure 1E:
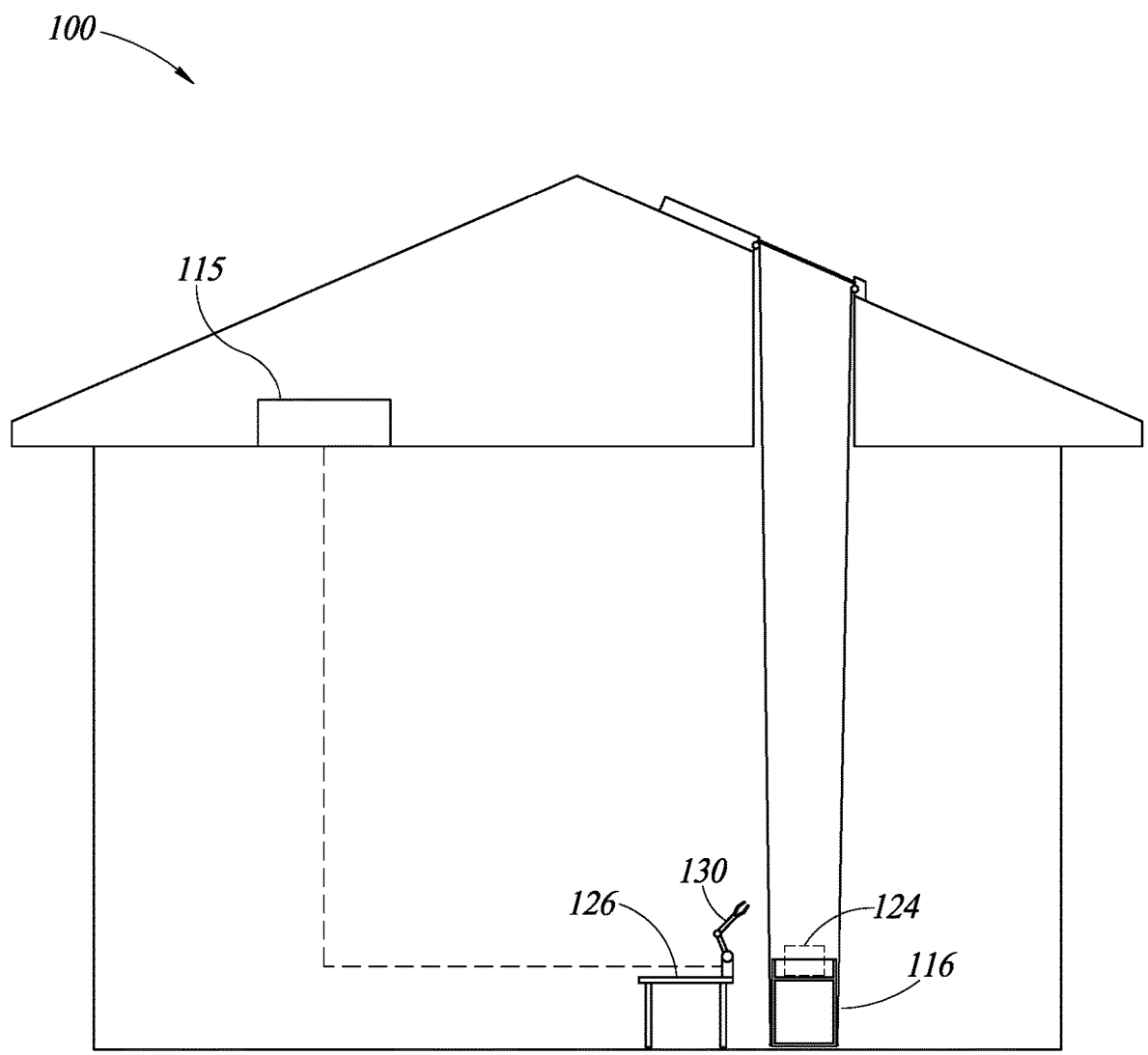
FIG. 1E is a schematic elevational view of the system of FIG. 1A with the platform in the third position and in range of a robotic manipulator for unloading the delivered package.

FIG. 1E illustrates an embodiment of the system 100 in the third position shown in FIG. 1C with a robotic manipulator 130 coupled to the table 126. The robotic manipulator 130 is in communication with the controller of the system 100 and, during operation, receives one or more signals or instructions from the controller to grasp and move the package 124 from the platform 116 to the table 126 and release the package 124 on the table. The robotic manipulator 130 may include various arms, joints, actuators, motors, drives, sensors and other like structures that enable at least one, at least two, or at least three degrees of freedom of motion of the manipulator 130. In other words, the manipulator 130 can move in or rotate about the x-, y-, and z-axis in some embodiments. Once the manipulator 130 removes the package 124 from the platform 116, the system returns to the first position shown in FIG. 1A.

Figure 1F:
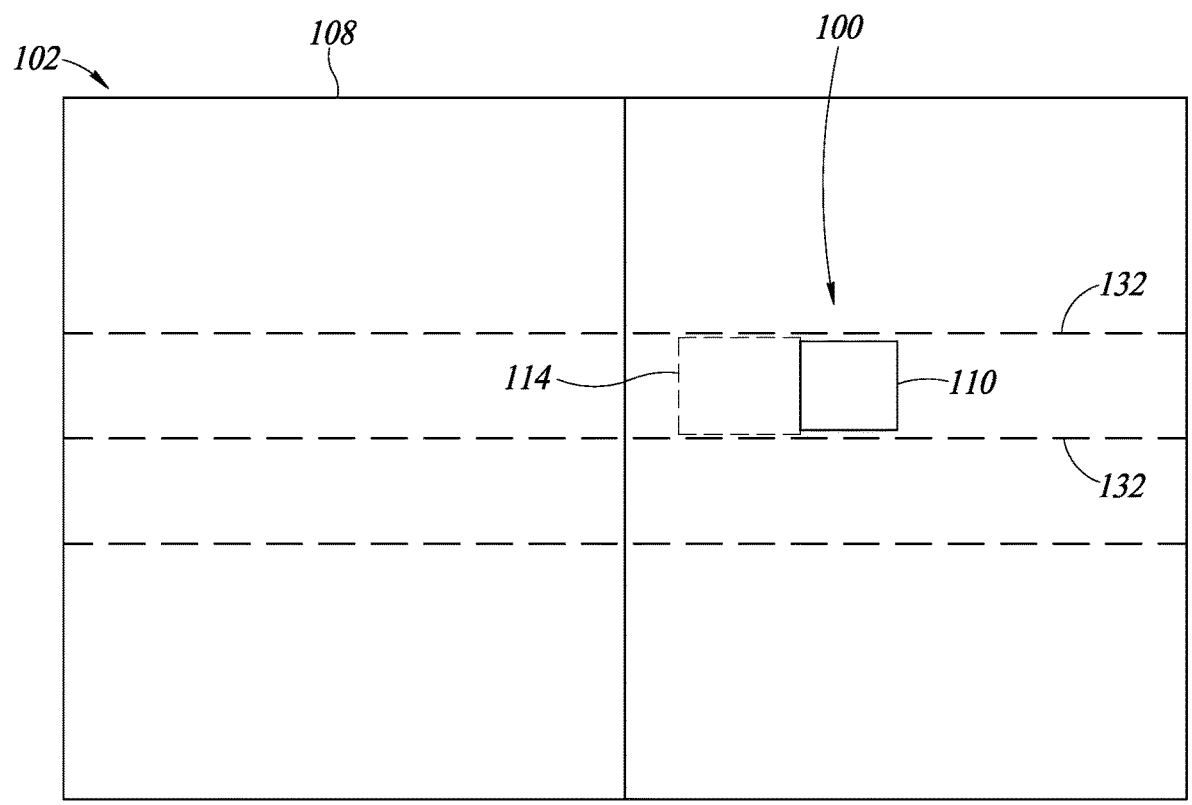
FIG. 1F is a schematic top plan view of the system of FIG. 1A installed between trusses of a roof of a structure.

FIG. 1F is a top plan view of the roof 108 showing coupling of the system 100 to the roof 108 in more detail. FIG. 1F shows the panel 110 coupled to the roof 108 between trusses of the roof, represented by dashed lines 132. In some embodiments, the system 100 and panel 110 have a size and a shape to be installed between two successive trusses 132 of the roof 108, such that modification of the trusses 132 or other structural changes to the roof 108 are not required for installation. The trusses 132 may be spaced 16 inches, 18 inches, 20 inches, or 24 inches on center, or some other dimension, according to local building guidelines for the structure 102. As such, the system 100 and panel 110 are similarly designed with dimensions less than the spacing distance between the trusses 132. In one or more embodiments, the panel 110 has a size and a shape that is greater than the distance between successive trusses 132, wherein portions of the trusses 132 are removed and framing and headers are installed for receiving the panel 110 and housing 114, similar to a skylight. In FIG. 1F, the housing 114 is shown in dashed lines to represent that the housing 114 may be installed in the roof 108 and covered by singles or other roof materials, such that it would not be visible in the illustrated plan view. In one or more embodiments, at least a portion of the housing 114 extends above the roof 118.

Figure 2:
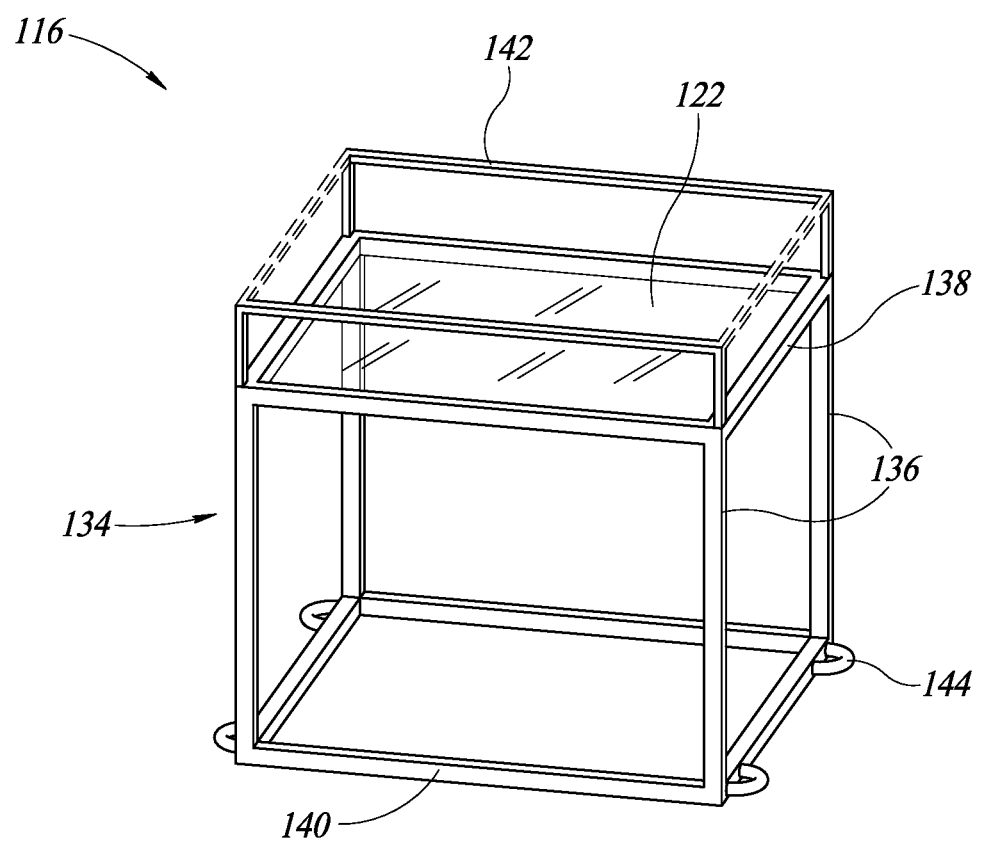
FIG. 2 is an axonometric view of the platform of FIG. 1A.

FIG. 2 is axonometric view of the platform 116 (which may also be referred to herein as a package receiving platform 116). As described above, the platform 116 includes the plate 122, which is coupled to a frame 134. The plate 122 may include one or more of a variety of known materials, such as glass, metal, plastic, wood, and others in addition to a coating layer, as described above. Further, the plate 122 may be at least partially formed, or wholly formed, of a transparent or translucent material in some embodiments to provide an aesthetically pleasing design similar to a skylight that allows natural light from an external environment to enter an internal space of a building. In this context only, a "transparent material" means a material allowing at least 50% and up to 100% of visible light to pass through the material when tested with a standard transparency meter. A "translucent material" means a material allowing at least 1% and up to 50% of light through the material when tested with a standard transparency meter. It is be appreciated that the above ranges of percentages include all integers and values to two decimal places. Thus, in one non-limiting example, the definition of "transparent" provided above includes 57.34% and 72.25%, among other values.

The frame 134 includes a plurality of supports 136, each of which may include any of the materials described above.

The plurality of supports 136 are coupled together to form a square or rectangular shape in some embodiments, although other shapes and sizes of the platform 116 are contemplated herein. In one non-limiting example, the frame 134 includes a first portion 138 and a second portion 140 coupled to the first portion by vertical supports 136. The first portion 138 may be an upper portion and the second portion 140 may be a base or lower portion, in some embodiments. The plate 122 is coupled to the first portion 138 by fasteners, adhesives, or other like coupling mechanisms. In one or more embodiments, the first portion 138 of the frame 134 includes a ledge or protrusions in the first portion 138 for receiving the plate 122.

The platform 116 further includes a rail 142 coupled to the frame 134 and more specifically, to the first portion 138 of the frame 134. In FIG. 2, portions of the rail 142 are shown in dashed lines to represent that one or more sides of the rail 142 may be omitted in some embodiments. In one non-limiting example, the rail 142 includes the dashed portions and extends around all four sides of the platform 116. In a further non-limiting example, one, two, or three sides of the rail 142 are omitted in order to allow for the package 124 (FIG. 1C) to slide off the plate 122, as described herein. The one or more sections of the rail 142 that are removed to enable the package 124 to slide can be selected according to design factors. Although the rail 142 is illustrated as being a plurality of structural elements that are coupled to the first portion 138 of the frame 134 and spaced from the first portion 138 and plate 122, the rail 142 could also be any structure for preventing movement of the package 124 in at least one direction on the platform 116. In some non-limiting examples, the rail 142 could be a solid piece of material coupled to one or more sides of the platform 116 with the height of the rail 142 selected according to design factors or one or more protrusions extending from the first portion 138 of the frame 134 to prevent movement of the package 124 on the plate 122 in at least one direction.

The platform 116 further includes a plurality of eyes 144 coupled to or integrated with the second portion 140 of the platform 116. The plurality of eyes 144 may also be referring to herein as a cable mounting arrangement 144 and may include other structures besides eyes 144 that are capable of coupling to, securing, or receiving a cable, such as rings, openings, apertures, protrusions, and other like structures. As shown in FIG. 2, the plurality of eyes 144 includes four eyes 144, with one eye 144 proximate to or at each corner of the second portion 140. The eyes 144 are structured to receive the cables 118 (FIG. 1A) and are arranged at a bottom of the platform 116 to enable movement of the platform 116 to the second position described with reference to FIG. 1B. In one or more embodiments, the eyes 144 are coupled to the frame 134 at any number of different positions on the frame 134, such as at the first portion 138 or anywhere between the first and second portions 138, 140. Further, although the eyes 144 are illustrated as being coupled to or integrated with the second portion 140 of the frame 134 at corners of the second portion 140, the eyes 144 can also be positioned with any selected spacing between the eyes 144 in one or more embodiments. Although FIG. 2 illustrates four eyes 144, there can be more or less than four eyes 144, such as two, three, four, five, six or more eyes 144 in yet further embodiments. In other instances, other coupling arrangements may be provided for securing the platform 116 to the cables 118.

Figure 3A:
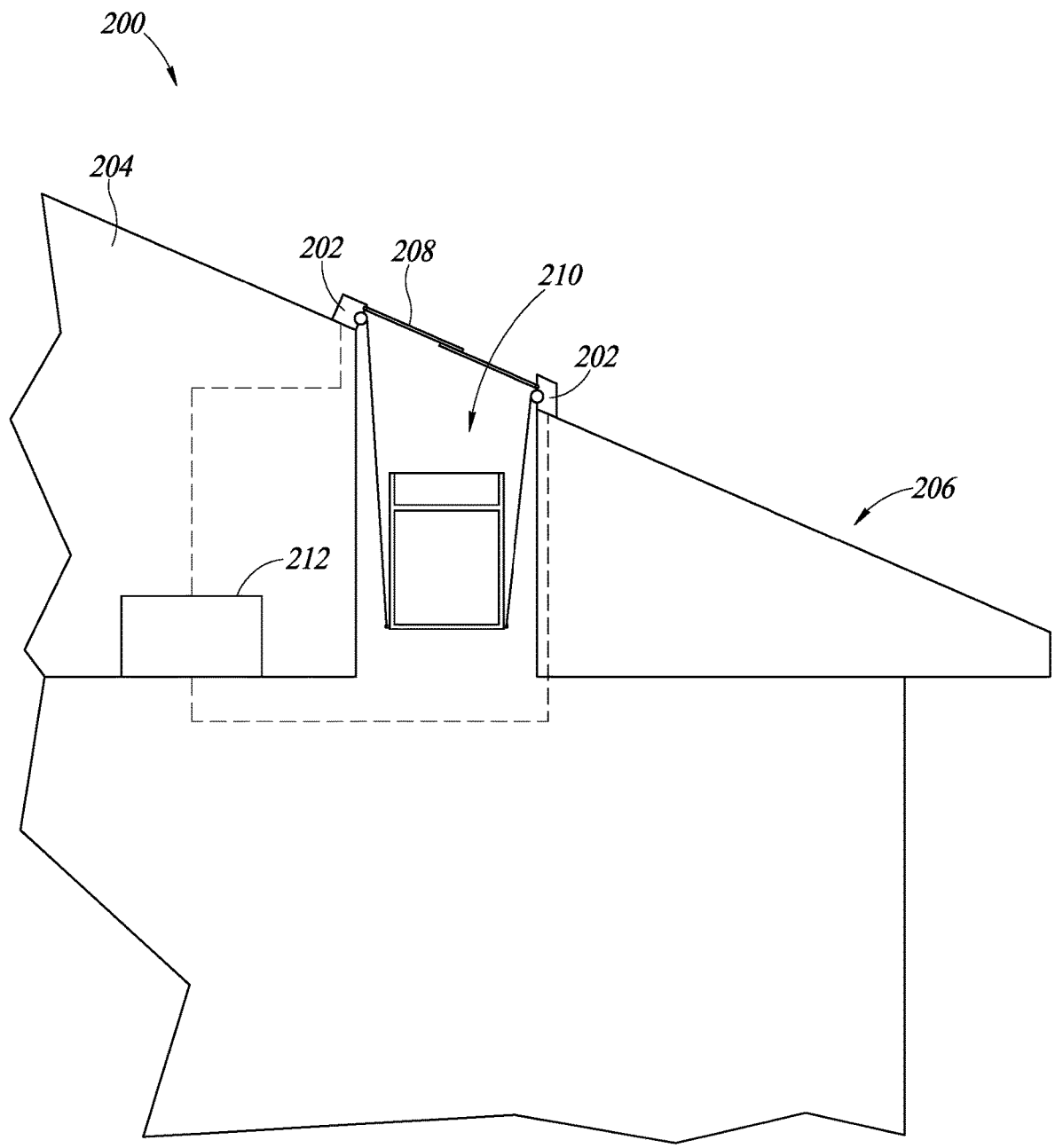
FIG. 3A is a schematic elevational view of an embodiment of a drone delivery system according to the present disclosure with doors in a closed position.

FIG. 3A is a schematic view of an embodiment of a drone delivery system 200 that may be similar to system 100 except as otherwise described below. The drone delivery system 200 includes one or more housings 202 coupled to a roof 204 of a structure 206 and a plurality of doors 208 rotatably coupled to the housings 202 to selectively provide access to an opening 210 in the roof. The housings 202 may include motors, gears, drive assemblies, or other like structures and the doors 208 may be coupled to the housings 202 with hinges, actuators, or rotatable joints, among other structures, to enable rotational motion of the doors 208. The housing 202 is in electronic communication with a controller 212 that sends one or more signals or instructions for activation of the structures in the housing 202 to operate the doors 208. In FIG. 3A, the doors 208 are illustrated in the closed position whereby access to the opening 210 is restricted by doors 208. Upon receipt of appropriate activation signals or instructions, the doors 208 rotate relative to the housings 202 to an open position shown in FIG. 3B.

Figure 4A:
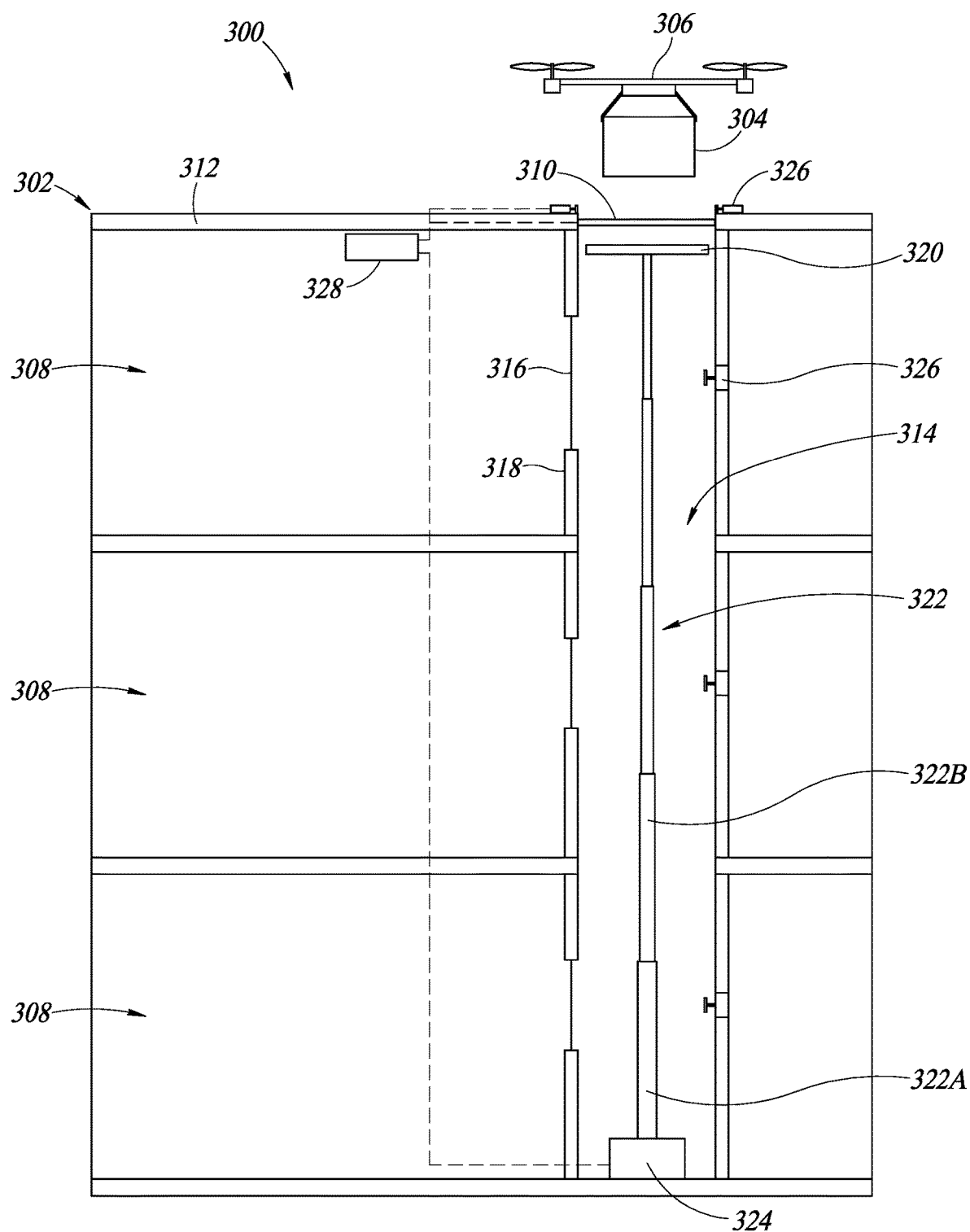
FIG. 4A is a schematic elevational view of an embodiment of a drone delivery system according to the present disclosure.

FIG. 4A is a schematic view of a drone delivery system 300 installed in a structure 302 with multiple floors, which may be a single or multi-family residence, an office building, an apartment building, or some other like structure. The system 300 is structured to receive a package 304 from a drone 306 and distribute the package 304 to different rooms 308 of the structure 302. The rooms 308 may be different floors of the structure 302 or may be different rooms on the same floor of the structure 302. The system 300 includes a panel 310 that may retract into and extend from a roof 312 of the structure 302 to selectively provide access to a shaft 314 in the structure 302, similar to panel 110 in FIG. 1A. As such, repetitive description of panel 310 has been omitted. Further, the system includes doors 316 that retract into and extend from walls 318 defining the shaft 314 in a similar manner to panel 110 in FIG. 1A to selectively provide access from the shaft 314 to the rooms 308 and vice versa.

The system 300 further includes a platform 320 coupled to a support 322 with both the platform 320 and the support 322 positioned in the shaft 314. The support 322 is coupled to a housing 324, which may include a motor, gears, a drive assembly, a hydraulic drive assembly, and other like structures for manipulating the support 322. In some embodiments, the support 322 may include sections arranged in a telescoping manner in order to change a position of the platform 320 within the shaft via drive components in the housing 324. In one non-limiting example, the support 322 includes sections 322A and 322B, with section 322B structured to be received in a bore through section 322A in a telescoping manner. The remaining sections of the support 322 may have a similar structure. Further, the number, size, and length of each section 322A, 322B can be selected based on the size of the shaft 314, the platform 320, the weight or load on the platform 320, and other design factors.

A plurality of actuators 326 (which may also be referred to herein as biasing elements 326) are coupled to the roof 312 and the walls 318 defining the shaft 314. The actuators 326 will be described in greater detail with reference to FIG. 4B, but briefly, the actuators 326 on the roof 312 are configured to position the package 304 on the panel 310 after the package 310 is released from the drone 306. The actuators 326 in the shaft 314 are configured to push the package 304 from the platform 320 and into a selected room 308 based on the intended destination or recipient of the package 304. The panel 310, the doors 316, the housing 324 and the actuators 326 are in electronic communication, either wired or wirelessly to a controller 328, as indicated by the various dashed lines in FIG. 4A. One or more embodiments of a controller, such as controller 328, will be described in detail with reference to FIG. 7. The controller 328 is illustrated in FIG. 4A as being coupled to the roof 312 and positioned in one of the rooms 308. In practice, the controller 328 may be located internal to any support of the structure 302, such as the roof 312, walls 318, or other structures. Further, the controller 328 may be located on top of the roof 312, or even external to the structure 302 in some embodiments. The controller 328 may also include a control system with a controller 328 in each room 308 or on each floor of the structure 302 that is in wireless communication via any communication protocol described herein with a master controller located elsewhere to the structure 302 or external to the structure 302.

Figure 4B:
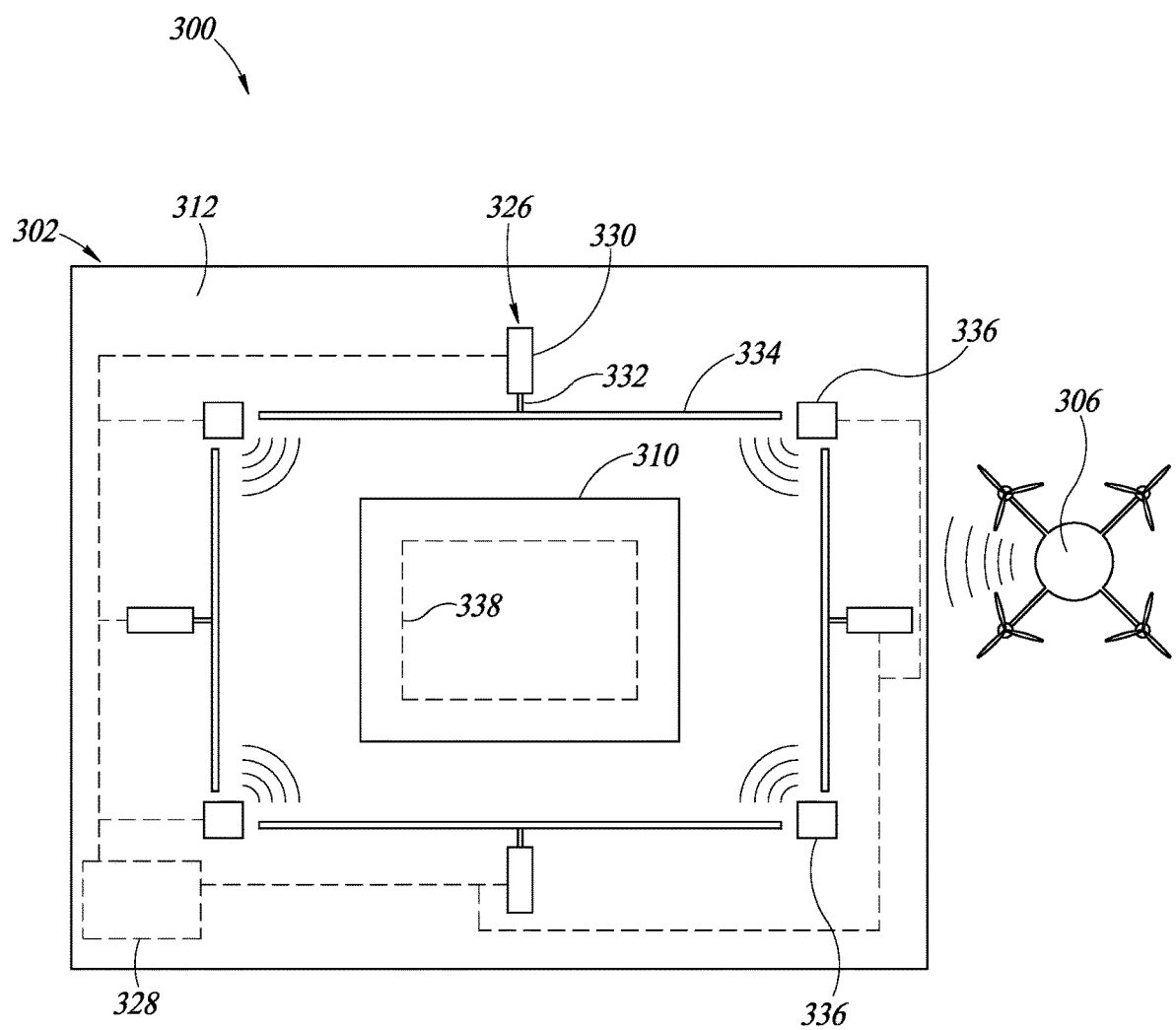
FIG. 4B is a schematic top plan view of the system of FIG. 4.

FIG. 4B is a plan view of the roof 312 of the structure 302 that provides additional detail of the system 300. The panel 310 is coupled to the roof 312 and structured to extend and retract from a housing, which may be embedded in the roof 312 or coupled to a top of the roof 312, as described herein. The panel 310 and housing can be configured such that the panel 310 can slide in any direction (i.e., left, right, up or down) in the orientation shown in FIG. 4B. In some embodiments, the system 300 includes four actuators 326 coupled to the roof 312, with each of the actuators 326 including a housing 330 coupled to an actuator arm 332 and a blade 334 coupled to the actuator arm 332. The actuators 326 may be linear actuators with the blades 334 of the actuators 326 arranged to form a square or rectangle around the panel 310. As such, the actuators 326 define a landing space for the package 304 (FIG. 4A), with the actuator arms 332 configured to extend and retract the blades 334 to manipulate the package 304 to be positioned over the panel 310.

In one non-limiting example, if drone 306 places the package 304 to the left and above the panel 310, two of the actuators 326 activate with the arms 332 pushing the corresponding blade 334 to move the package 304 down and to the right so that the package 304 is aligned with the panel 310. Each of the actuators 326 is in electronic communication with the controller 328, either wired or wirelessly, as indicated by dashed lines in FIG. 4B. The number, position, and characteristics (i.e., size of the arm 332, size of the blade 334, load capacity, etc.) of the actuators 326 can be selected according to design factors. As such, the system 300 may include more or less than four actuators 326, such as one, two, three, five, six or more actuators 326, in any selected size or position relative to the panel 310.

The system 300 further includes a plurality of sensors 336 coupled to the roof 312 and in electronic communication, either wired or wirelessly, with the controller 328. The sensors 336 may be proximity sensors, in some embodiments. As shown in FIG. 4B, the plurality of sensors 336 may include four sensors 336 arranged at the corners of the landing zone defined by the blades 334 of the actuators 326. In one or more embodiments, the sensors 336 are positioned on any location on the roof 312 with a line of sight or field of view to the landing zone defined by the blades 334 of the actuators 326. The sensors 336 are operative to detect the location of the package 304 (FIG. 4A) and transmit signals regarding the same to the controller 328. The controller 328 determines, based on the received signals from the sensors 336, whether to activate one or more of the actuators 326 to move the package 304.

Arrangement of the sensors 336 at the corners of the landing area is beneficial because this location provides for a wide field of view for each sensor 336 while also minimizing or preventing interference with the blades 334 of the actuators 326. Put differently, arranging sensors 336 at the corners enables optimal operation of the sensors while also maximizing the blade length of the blades 334 of the actuators 326. Thus, the positioning of the sensors 336 reduces the risk that a package 304 is not detected by the sensors 336 while also ensuring that the blades 334 are long enough to move the package 304 anywhere in the landing zone. In some embodiments, the field of view of the sensors 336 overlap with each other to cover the entire landing zone between the blades 334 of the actuators 326.

In some embodiments, the system 300 further includes an authentication device 338 on the roof 312. As shown in FIG. 4B, the authentication device 338 is embedded in or positioned on the panel 310. However, the authentication device 338 can be located anywhere on the roof 312 in one or embodiments, such as anywhere in the landing zone defined by the blades 334 or outside of the landing zone. The authentication device 338 is illustrated in dashed lines because the authentication device 338 could be one of any number of different structures or subsystems. In one non-limiting example, the authentication device 338 is a radio-frequency identification (RFID) coil or coil array that is in electronic communication with the controller 328 and uses an electromagnetic field to interact with a tag on the package 304 or drone 306. The tag on the package 304 or drone 306 includes a coil or coil array that stores bits of information that may include a unique identification key for the recipient of the package. The electromagnetic field generated by the authentication device 338 energizes the coil of the tag and enables the tag to transmit the unique identification key to the authentication device 338, which, in conjunction with the controller 328, determines whether the identification key matches a recipient in the structure 302. If so, then the system 300 activates and the drone 306 places the package 304 in the landing zone. If not, then the system 300 communicates instructions to the drone 306 that the package is unauthorized and should not be dropped on the roof 312.

In a further non-limiting example, the authentication device 338 may be a quick response (QR) code in or on the panel 310 or roof 312 that is scanned by a sensor or camera on the drone 306. The drone 306 determines whether the scanned QR code matches the code for one or more recipients in the structure 302 and if so, releases the package 304 onto the roof. In yet further examples, the authentication device 338 may use an authentication system based on a unique identifier for the structure 302 or each recipient, similar to an Internet protocol ("IP") address with the authorized IP addresses for the structure 302 stored in the controller 328. In yet further examples, the authentication device 338 may include similar authentication functionality as "tap to pay" credit card systems or automobile or home keyless entry systems, such as Google® Nest® and Key® by Amazon®. Still further, authentication of the package may be based on Global Positioning System ("GPS"). The drone 306 may temporarily store, in an onboard controller or other hardware, GPS coordinates associated with the intended structure 302 for delivery. The drone 306 maneuvers to the coordinates and only releases the package 304 if the drone reaches the intended coordinates, which may be in an X-, Y-, and Z-plane. The authentication device 338 can also include any other known wireless identification system or method.

Thus, in operation, and with reference to FIG. 4A and FIG. 4B, the system 300 detects the incoming package 304 via communication with the drone 306 and authorizes the package 304, as explained above. Once the package 304 is authorized for delivery, the controller 328 activates the panel 310 to provide access to the shaft 314 and platform 320. Once the panel 310 is retracted, the drone 306 releases the package 304 onto the roof 312 with the target being the landing zone between blades 334 of the actuators 326. The controller 328 send signals or instructions to activate the sensors 326, which provide information to the controller 328 for determination of whether the package 304 is on the platform 320 or whether the package 304 should be moved to the platform 320. If the package 304 is not on the platform 320, the controller 328 sends signals or instructions to corresponding actuators 326 to move the package toward the platform 320 until the package 304 is received on the platform. If, however, the package 304 is on the platform 320 at the first instance, then the controller 328 does not activate the actuators 326. Then, the controller 328 activates the drive assembly in housing 324 to manipulate the support 322 and move the package 304 into the structure 302.

After the package 304 moves into the structure 302, the controller 328 sends signals or instructions to return the panel 310 to its closed position and also to continue manipulating the support 322 until the package 304 arrives at its intended destination room 308. The system 300 may determine the correct room 308 by a directory that is stored in a memory of the controller 328 in combination with authentication of the package 304 described with reference to FIG. 4B. For example, each package 304 may have a tag that is unique to specific recipient. As such, when the package 304 is identified and authenticated, the controller 328 receives information about a specific recipient and may reference the directory for transmission of the package 304 to the intended recipient. Once the platform 320 is at the correct room 308, the controller 328 sends one or more signals or instructions to open a corresponding one of the doors 316 to provide access to the room 308 and activates the corresponding actuator 326 in the shaft 314 to push the package 304 off the platform 320 and into the room 308. Then, the controller 328 sends one or more signals to return the door 316 to its closed position and manipulate the platform 320 and support 322 back to the starting position shown in FIG. 4A.

Figure 5:
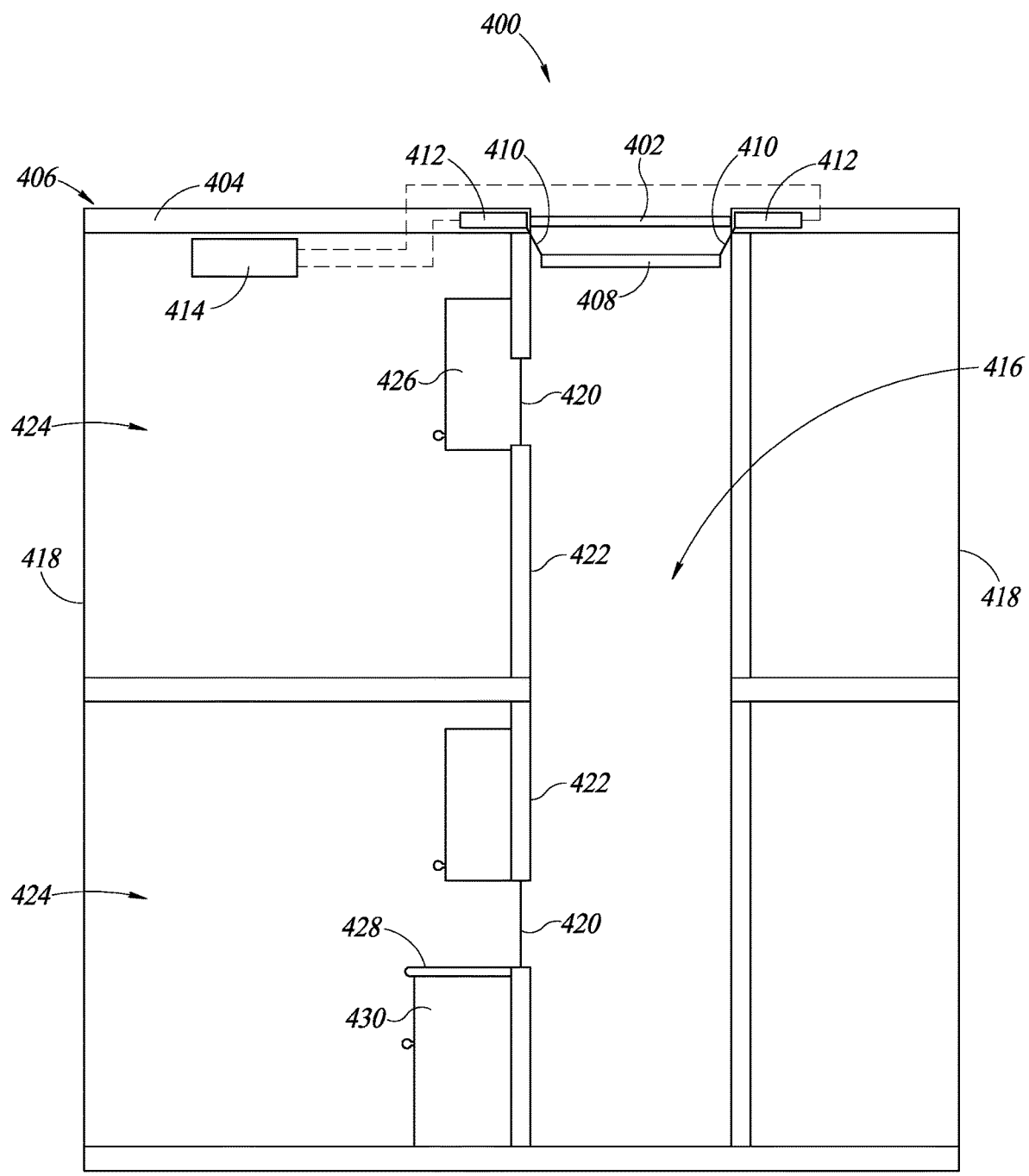
FIG. 5 is a schematic elevational view of an embodiment of a drone delivery system according to the present disclosure.

FIG. 5 illustrates one or more embodiments of a drone delivery system 400 that may be similar to the other systems 100, 200, 300 described herein except as otherwise described below. The drone delivery system 400 includes a retractable panel 402 installed in a roof 404 of a structure 406. Further, the system 400 includes a platform 408 coupled to cables 410, which are respectively coupled to a housing 412. Each of the housings 412 are coupled to the roof 404 and in some embodiments, may be positioned between the ceiling and the roof 404 of the structure 406 with openings for the cables 410. The platform 408 is flat and planar in some embodiments may include a single material, such as metal, glass, wood, plastic, or any other conventional material. Further, the platform 408 does not include a frame or a rail in one or more embodiments. In yet further embodiments, the platform 408 may include a frame around an outside of the platform 408 in order to support a glass panel. The cables 410 may be coupled to the platform 408 by any conventional means, such as fasteners, adhesives, and the like.

The housings 412 include spools for winding and unwinding the cables 410 with the spools driven by a rotary motor. The housings 412 and the motors are in electronic communication with a controller 414, which may send one or more signals or instructions to the motors to wind or unwind the spools in order to change a length of the cables 410 and a position of the platform 408 in a shaft 416 in the structure 406. In some embodiments, the shaft 416 is positioned in a central location in the structure 406 while in one or more embodiments, the shaft 416 is adjacent outer walls 418 of the structure 406. The system 400 further includes doors 420 that are structured to retract into walls 422 of the structure 406 to selectively provide access to rooms 424 of the structure 406 from the shaft 416.

As shown in FIG. 5, a cabinet 426 is coupled to the wall 422 and aligned with the upper door 420, such that the system 400 can lower the platform 408 and deliver a package inside of cabinet 426. In some embodiments, the cabinet 426 has an opening at an interface with the wall 422 that is the same size and shape as the opening in the wall 422 for the upper door 420. As such, when the door 420 is retracted into the wall 422, the system 400 can deliver a package into the cabinet 426. The cabinet 426 may be positioned in any room in the structure 406, such as the kitchen, office, bedroom, living room, family room, closet, or others. FIG. 5 further illustrates that the lower door 420 is aligned with a countertop 428 coupled to a cabinet 430. When the lower door 420 is retracted into wall 422, a package can be delivered from platform 408 onto the countertop 428. As such, embodiments of the disclosure provide for delivery of packages by the systems described herein to selected and convenient locations in a structure.

Figure 6:
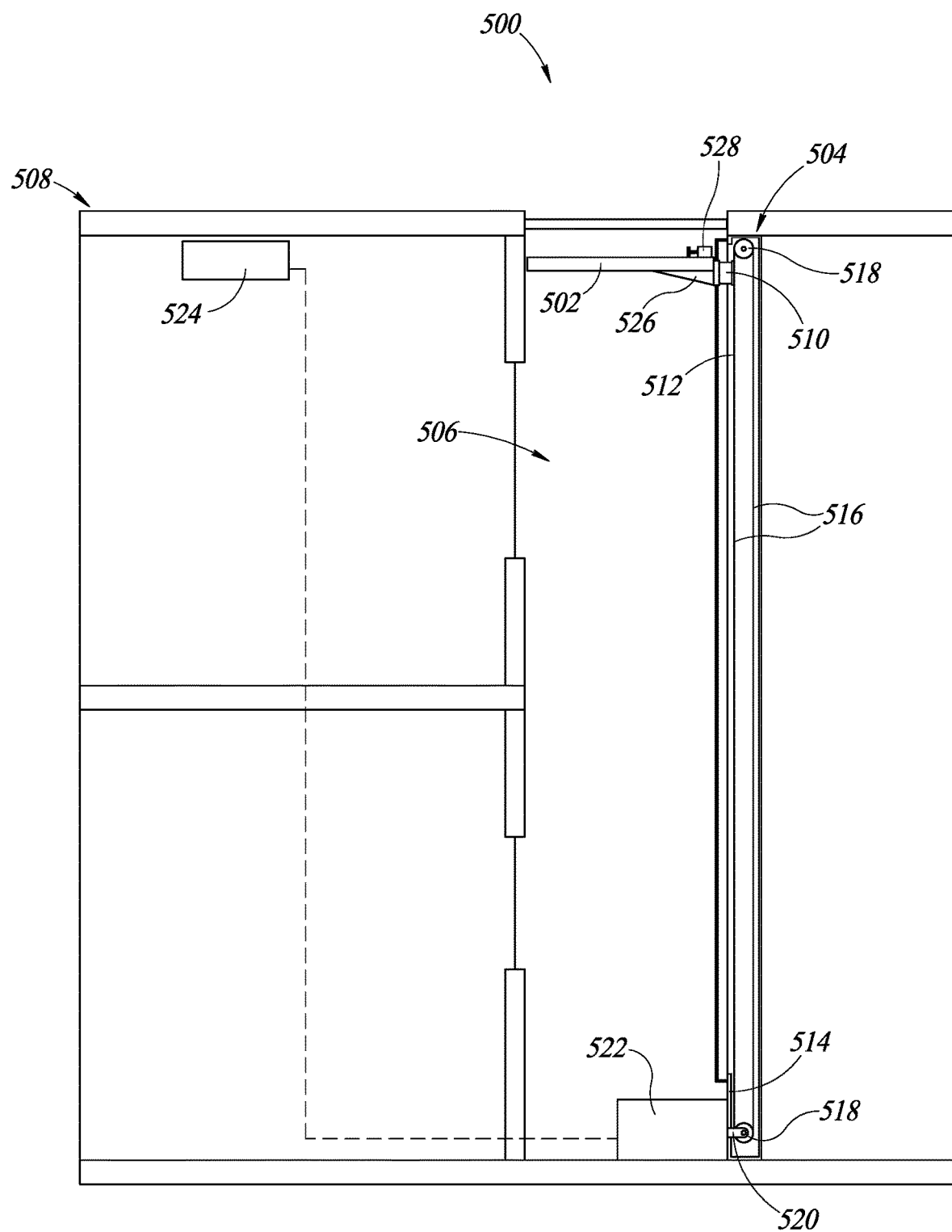
FIG. 6 is a schematic elevational view of an embodiment of a drone delivery system according to the present disclosure.

FIG. 6 illustrates one or more embodiments of a drone delivery system 500 that may be similar to systems 100, 200, 300, 400 described herein unless otherwise noted. System 500 includes a platform 502 coupled to a slide assembly 504 that is structured to move the platform 502 along a shaft 506 in a structure 508. The slide assembly 504 includes a slide element 510 coupled to the platform 502 and to a linear guide 512 that is coupled to a wall 514 of the structure 508. The slide element 510 is structured to move along the linear guide 512. The slide element 510 is further coupled to a belt 516 that is configured to rotate about pulleys 518. A lower one of the pulleys 518 is coupled to a drive 520 of a motor 522 with the motor 522 being a bi-directional electric rotary motor with forward and reverse drive in some embodiments.

In operation, a controller 524 in electronic communication with the motor 522 sends one or more signals or instructions to the motor 522 to activate the drive 520 and rotate the lower pulley 518. The direction of rotation of the lower pulley 518 determines the movement of the slide element 510 along the linear guide 512 and thus the movement of the platform 502 in the shaft 506. In one non-limiting example, rotation of the drive 520 in a clockwise direction results in movement of the belt 516 clockwise around the pulleys 518, which moves the platform 502 upwards and away from a bottom of the shaft 506. The rotation of the drive 520 in an opposite, counterclockwise direction produces the opposite result. More specifically, counterclockwise rotation of the drive 520 results in counterclockwise movement of the belt 516 around pulleys 518 and movement of the platform 502 down the shaft 506 and towards the bottom of the shaft 506.

In some embodiments, the system 500 includes a support 526 coupled to the platform 502 to provide reinforcement against heavier packages or loads on the platform 502. The support 526 is similarly coupled to the sliding element 510 so that the support 526 does not interfere with movement of the platform 502. Further, the system 500 includes an actuator 528 coupled to the platform 502 and structured to push packages off of the platform 502 and to a final destination. The actuator 528 may be in electronic communication with the controller 524 and receive power from the motor 522 or from an external power source. The actuator 528 is similar in form and function to actuators 326 (FIG. 4B) described herein, in some embodiments.

Figure 7:
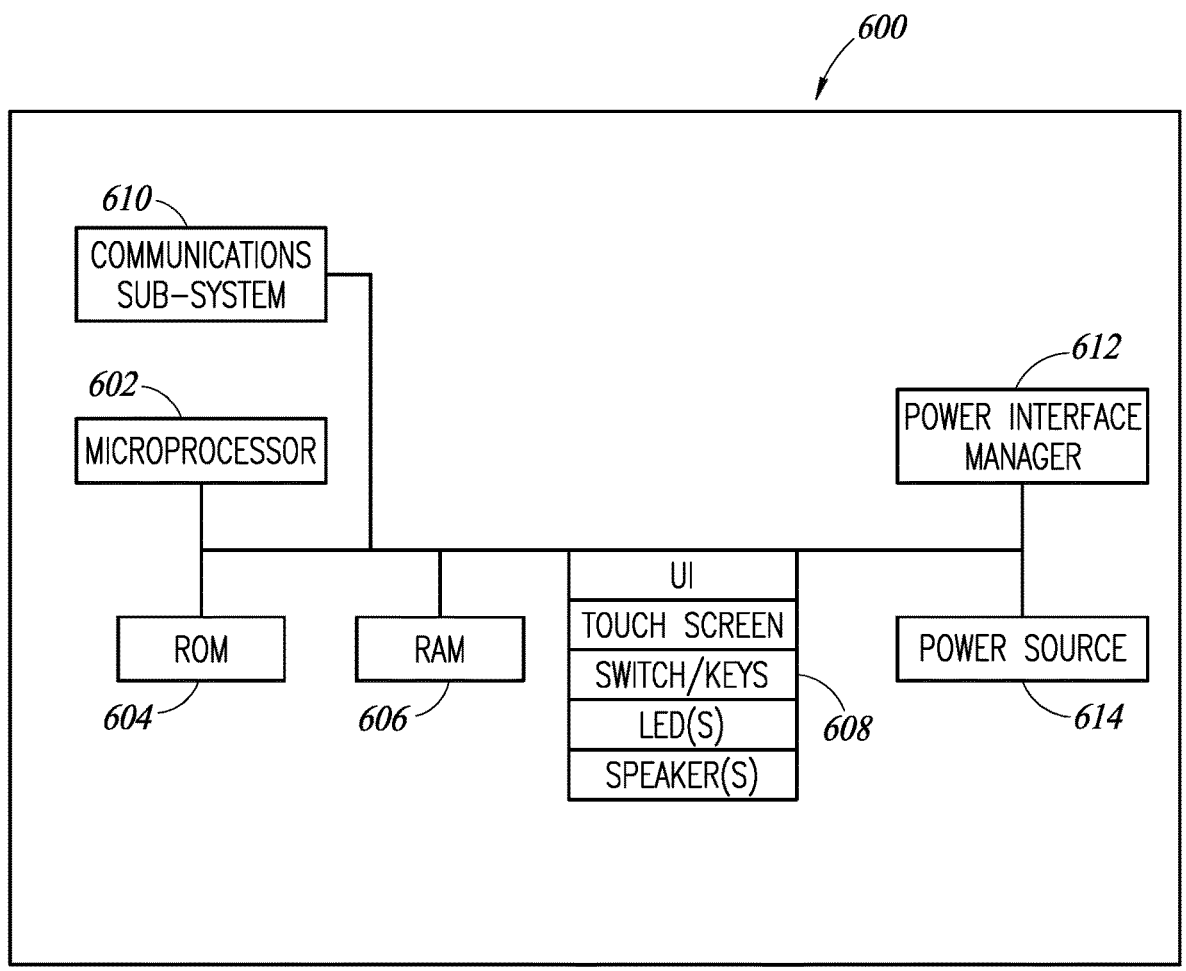
FIG. 7 is a schematic representation of an embodiment of a controller for a drone delivery system according to the present disclosure.

FIG. 7 illustrates in detail one or more embodiments of a controller 600. The controller 600 may be implemented as any controller described herein, such as controller 115, controller 212, controller 328, controller 414, and/or controller 524. In particular, the controller 600 is generally operable to provide power to the systems 100, 200, 300, 400, 500, in some embodiments, as well as one or more signals or instructions for activation of the various devices described herein associated with the systems 100, 200, 300, 400, 500. Further, the controller 600 is operable to communicate with the authentication device 338 and/or the drone 306 to authenticate the incoming package 304. FIG. 7 schematically illustrates various control systems, modules, or other sub-systems that operate to control the systems described herein, including the exchange of data between the components of the systems and the controller 600.

The controller 600 includes a control device 602. In some non-limiting examples, the control device 602 may be one or more of a microprocessor, a digital signal processor, a programmable gate array (PGA) or an application specific integrated circuit (ASIC). The controller 600 includes one or more non-transitory storage mediums, such as read only memory (ROM) 604, random access memory (RAM) 606, Flash memory (not shown), or other physical computer- or processor-readable storage media. The non-transitory storage mediums may store instructions and/or data used by the control device 602, for example an operating system (OS) and/or applications. The instructions as executed by the control device 602 may execute logic to perform the functionality of the various embodiments of the systems 100, 200, 300, 400, 500 described herein, including, but not limited to, authenticating a package and activating or deactivating motors to manipulate doors, platforms, and other devices described herein.

In some embodiments, the controller 600 may include a user interface 608 to allow an end user to operate or otherwise provide input to the systems 100, 200, 300, 400, 500 regarding the operational state or condition of the systems. The user interface 608 may include a number of user actuatable controls accessible from the systems 100, 200, 300, 400, 500. For example, the user interface 608 may include a number of switches or keys operable to turn the systems 100, 200, 300, 400, 500 ON and OFF and/or to set various operating parameters of the systems 100, 200, 300, 400, 500 as well to input characteristics of recipients of packages at a given structure. For example, the user may input, via user interface 608, a unique identification code for each recipient in the structure as well as input information regarding recipient location within the structure (i.e. a directory of each user's general location) to assist with package delivery.

Additionally, or alternatively, the user interface 608 may include a display, for instance a touch panel display. The touch panel display (e.g., liquid crystal display, light emitting diode display, or organic light emitting diode display with touch sensitive overlay) may provide both an input and an output interface for the end user. The touch panel display may present a graphical user interface, with various user selectable icons, menus, check boxes, dialog boxes, and other components and elements selectable by the end user to set operational states or conditions of the systems 100, 200, 300, 400, 500. The user interface 608 may also include one or more auditory transducers, for example one or more speakers and/or microphones. Such may allow audible alert notifications or signals to be provided to an end user. In one non-limiting example, the auditory transducers may provide an audible notification to the user when a package is incoming for delivery or when a package has been successful delivered. Such may additionally, or alternatively, allow an end user to provide audible commands or instructions.

The user interface 608 may include additional components and/or different components than those illustrated or described, and/or may omit some components.

The switches and keys or the graphical user interface may, for example, include toggle switches, a keypad or keyboard, rocker switches, trackball, joystick or thumb stick. The switches and keys or the graphical user interface may, for example, allow an end user to turn ON the systems 100, 200, 300, 400, 500, start, end, or change package delivery operations, communicably couple or decouple to remote accessories and programs, access, transmit, or process data, activate or deactivate motors or audio subsystems, start or end an operational state of the systems 100, 200, 300, 400, 500, etc.

The controller 600 includes a communications sub-system 610 that may include one or more communications modules or components which facilitate communications with various components of one or more external device, such as a personal computer or processor, etc. The communications sub-system 610 may provide wireless or wired communications to the one or more external devices. The communications sub-system 610 may include wireless receivers, wireless transmitters or wireless transceivers to provide wireless signal paths to the various remote components or systems of the one or more paired devices. The communications sub-system 610 may, for example, include components enabling short range (e.g., via Bluetooth, near field communication (NFC), or radio frequency identification (RFID) components and protocols) or longer range wireless communications (e.g., over a wireless LAN, Low-Power-Wide-Area Network (LPWAN), satellite, or cellular network) and may include one or more modems or one or more Ethernet or other types of communications cards or components for doing so. The communications sub-system 610 may include one or more bridges or routers suitable to handle network traffic including switched packet type communications protocols (TCP/IP), Ethernet or other networking protocols. In some embodiments, the wired or wireless communications with the external device may provide access to a look-up table with directory information for intended recipients of packages within a structure as well as a catalog of unique identifiers associated with recipients in a structure.

The controller 600 includes a power interface manager 612 that manages supply of power from a power source 614 to the various components of the controller 600 as well as the various components of the systems 100, 200, 300, 400, 500. The power interface manager 612 is coupled to the control device 602 and the power source 614. Alternatively, in some embodiments, the power interface manager 612 can be integrated in the control device 602. The power source 614 may include an external power supply or batteries, among others. The power interface manager 612 may include power converters, rectifiers, buses, gates, circuitry, etc. In particular, the power interface manager 612 can control, limit, restrict the supply of power from the power source based on the various operational states of the systems 100, 200, 300, 400, 500.

In some embodiments, the instructions and/or data stored on the non-transitory storage mediums that may be used by the control device 602, such as, for example, ROM 604, RAM 606, and Flash memory (not shown), includes or provides an application program interface ("API") that provides programmatic access to one or more functions of the controller 600. For example, such an API may provide a programmatic interface to control one or more operational characteristics of the systems 100, 200, 300, 400, 500. Such control may be invoked by one of the other programs, other remote device or system (not shown), or some other module. In this manner, the API may facilitate the development of third-party software, such as various different user interfaces and control systems for other devices, plug-ins, and adapters, and the like to facilitate interactivity and customization of the operation and devices within the systems 100, 200, 300, 400, 500.

In one or more embodiments, components or modules of the controller 600 and other devices within the systems 100, 200, 300, 400, 500 are implemented using standard programming techniques. For example, the logic to perform the functionality of the various embodiments described herein may be implemented as a "native" executable running on the control device, e.g., microprocessor 602, along with one or more static or dynamic libraries. In other embodiments, various functions of the control device 602 may be implemented as instructions processed by a virtual machine that executes as one or more programs whose instructions are stored on ROM 604 and/or random RAM 606. In general, a range of programming languages known in the art may be employed for implementing such embodiments, including representative embodiments of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VB Script, and the like), or declarative (e.g., SQL, Prolog, and the like).

The embodiments described above may also use well-known or other synchronous or asynchronous client-server computing techniques. However, the various components may be implemented using more monolithic programming techniques as well, for example, as an executable running on a single microprocessor, or alternatively decomposed using a variety of structuring techniques known in the art, including but not limited to, multiprogramming, multithreading, client-server, or peer-to-peer (e.g., Bluetooth®, NFC or RFID wireless technology, mesh networks, etc., providing a communication channel between the devices within the systems 100, 200, 300, 400, 500), running on one or more computer systems each having one or more central processing units (CPUs) or other processors. Some embodiments may execute concurrently and asynchronously, and communicate using message passing techniques. Also, other functions could be implemented and/or performed by each component/module, and in different orders, and by different components/modules, yet still achieve the functions of the controller 600.

In addition, programming interfaces to the data stored on and functionality provided by the controller 600, can be available by standard mechanisms such as through C, C++, C#, and Java APIs; libraries for accessing files, databases, or other data repositories; scripting languages; or Web servers, FTP servers, or other types of servers providing access to stored data. The data stored and utilized by the controller 600 may be implemented as one or more database systems, file systems, or any other technique for storing such information, or any combination of the above, including embodiments using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules within the systems 100, 200, 300, 400, 500 in different ways, yet still achieve the functions of the controller 600 and systems 100, 200, 300, 400, 500.

Furthermore, in some embodiments, some or all of the components of the controller 600 and components of other devices within the systems 100, 200, 300, 400, 500 may be implemented or provided in other manners, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques.

In some embodiments, the controller 600 is similar to controller 115 in system 100 described with reference to FIGS. 1A-1F and the memories 604, 606 may store instructions that, when executed by the control device 602, enable the functionality of the system 100. For example, the memories 604, 606 may store instructions that are executed by the control device 602 to selectively provide power from the power source 614 to the motor associated with panel 110 to selectively activate the motor and provide access to the opening 112. Further, the memories 604, 604 may store instructions that are executed by the control device 602 to selectively provide power from the power source 614 to the motor associated with the spools 120 to wind or unwind the cables 118.

Figure 3B:
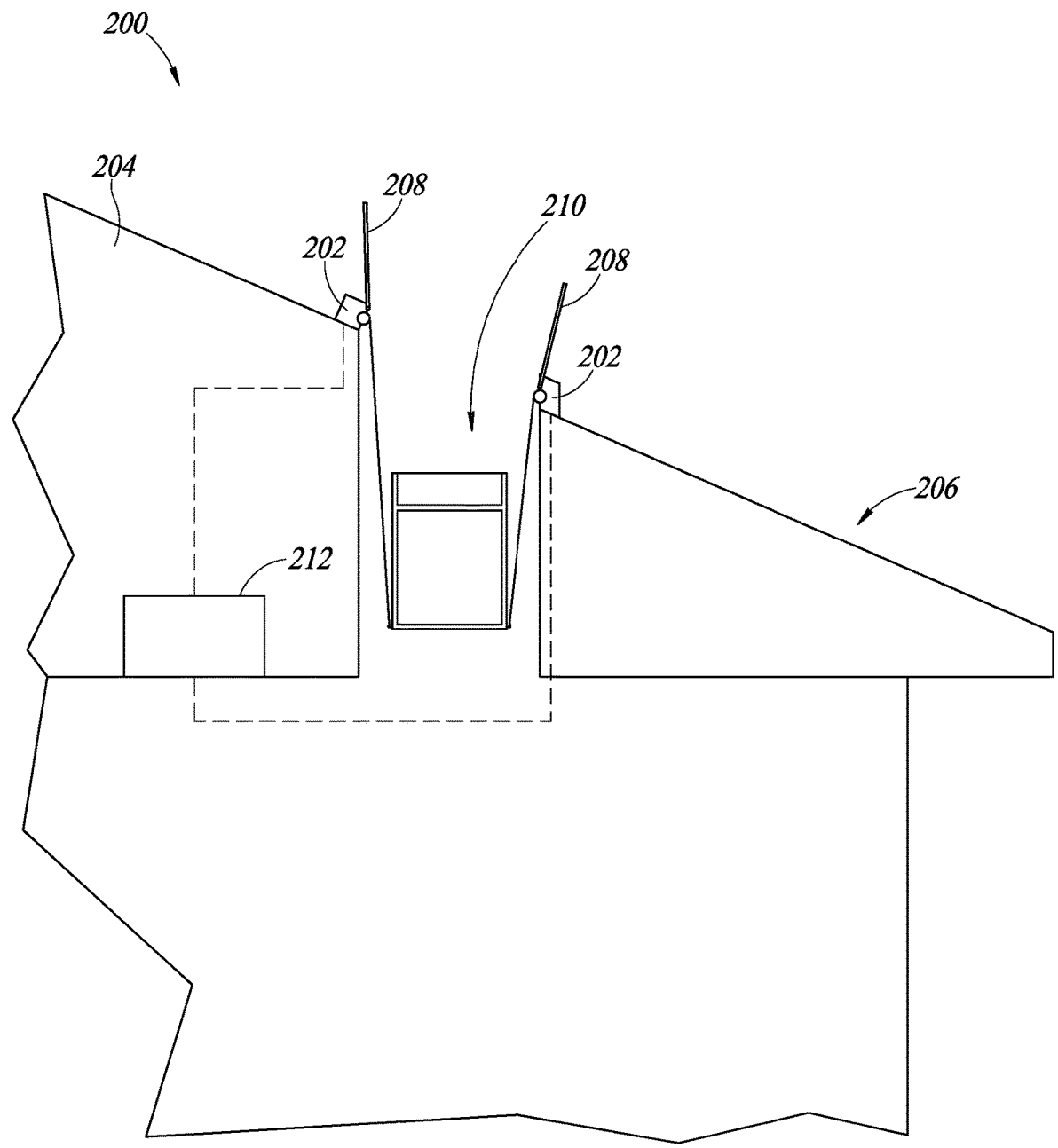
FIG. 3B is a schematic elevational view of the system of FIG. 3A with the doors in an open position.

With reference to FIG. 3A and FIG. 3B, and with continuing reference to FIG. 7, the controller 212 may be similar to the controller 600 and the memories 604, 606 may store instructions that, when executed by the control device 602, selectively provide power from the power source 614 to the motor associated with doors 208 to cause rotation of the doors 208 relative to housings 202 between the open and closed positions.

In FIG. 4A and FIG. 4B, and with continuing reference to FIG. 7, the controller 328 may be similar to the controller 600 and the memories 604, 606 may store instructions that, when executed by the control device 602, selectively provide power to the authentication device 338 to read a tag on the drone 306 or the package 304. The memories 604, 606 may also store directory information for the structure 302 that can be accessed by the control device 602 to verify whether a detected package 304 is authenticated for delivery to someone in the structure 302. For example, the memories 604, 606 may store a library of authorized identification codes that are associated with tags on the drone 306 or the package 304. Further, the memories 604, 606 may store a library of authorized identification codes for occupants of the structure 302. The communications sub-system 610 may reference such libraries and communicate one or more of these codes to the drone 306 for authorizing delivery of the package 304.

The memories 604, 606 may also store instructions that, when executed by the control device 602, selectively provide power from the power source 614 to the sensors 336. The sensors 336 may send signals or information to the controller 600 regarding the detected position of the package 304. Then, the control device 302 can execute instructions stored in memories 604, 606 to determine whether the package 304 is received on the panel 310, or whether the power source 614 should be activated to selectively provide power to the actuators 326 and move the package 304 to the panel 310. Further, the control device 602 may execute instructions stored in memories 604, 606 for manipulating the support 322 to move the platform 320 in the shaft 314, and also to provide power to the motor associated with the doors 316 and actuators 326 in the shaft 314 to move the package 304 from the platform 320 and through doors 316 to the final delivery location.

In FIG. 5, the controller 414 may be similar to controller 600 and execute any of the functionality described herein. For example, operation of system 400 may be similar to aspects of operation of systems 100, 300 described herein with repetitive description omitted.

With respect to FIG. 6, the controller 524 may be similar to controller 600 and may execute instructions stored in memories 604, 606 for selectively activating the motor 522 to rotate pulley 518 and manipulate the belt 516 for moving the platform 502 in the shaft 506. Further, the controller 524 may have similar functionality to the other controllers described herein.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. In other instances, well-known structures associated with drone delivery systems have not been shown or described in detail to avoid unnecessarily obscuring descriptions of the embodiments. The teachings provided herein of the various embodiments can be applied outside of the drone delivery context, and not necessarily the drone delivery systems and methods generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any computer-readable medium for use by or in connection with any processor-related system or method. In the context of this disclosure, a memory is a computer-readable medium that is an electronic, magnetic, optical, or other physical device or means that contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other nontransitory media.

Many of the methods described herein can be performed with variations. For example, many of the methods may include additional acts, omit some acts, and/or perform acts in a different order than as illustrated or described.

Unless the context requires otherwise, throughout the specification and claims which follow, the word "comprise" and variations thereof, such as, "comprises" and "comprising" are to be construed in an open, inclusive sense, that is as "including, but not limited to." Further, the terms "first," "second," and similar indicators of sequence are to be construed as interchangeable unless the context clearly dictates otherwise.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The relative terms "approximately" and "substantially," when used to describe a value, amount, quantity, or dimension, generally refer to a value, amount, quantity, or dimension that is within plus or minus 5% of the stated value, amount, quantity, or dimension, unless the content clearly dictates otherwise. It is to be further understood that any specific dimensions of components provided herein are for illustrative purposes only with reference to the embodiments described herein, and as such, the present disclosure includes amounts that are more or less than the dimensions stated, unless the context clearly dictates otherwise.

The software used to perform actions described herein can be run on any suitable computer hardware system, including a computer system having various input and output devices, a memory system, one or more processors (e.g., a central processing unit), one or more network connections, a display device, etc., with mobile phones and tablets being examples of suitable computer hardware. Thus, one or more computers execute computer instructions to perform embodiments described herein. Moreover, the various embodiments described herein may include the presentation of one or more graphical user interfaces to a user via a display device. In some embodiments, the user may utilize one computing device to access a second, remote computing device, such as via a website or other remote connection, that is performing the embodiments described herein. Any of the software features or modules described herein can be linked to or integrated with other software packages and systems, such as to handle, manage, or perform the functionality described herein.

Additionally, the various embodiments may be methods, systems, media, or devices. Accordingly, the various embodiments may be entirely hardware embodiments, entirely software embodiments, or embodiments combining software and hardware aspects. Unless the context requires otherwise, reference throughout the specification to "software" or "software system" refer to the functionality performed by or operations of computing devices, whether performed entirely by software, entirely by hardware, or a combination thereof.

Features and aspects of the various embodiments and embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method, comprising:
    detecting an incoming package from a delivery device;
    authorizing the incoming package;
    manipulating an access panel coupled to a roof to provide access to an opening in the roof at a first instance;
    activating a drive assembly to retract at least one cable coupled to a cable mounting arrangement of a lower portion of a package receiving platform into a housing disposed on the roof to raise the package receiving platform to a first position with a rail extending around a package support plate of an upper portion of the package receiving platform extending through the opening in the roof with the package support plate of the package receiving platform planar with or extending beyond at least a portion of the roof to receive the package on the package support plate;
    detecting receipt of the package on the package receiving platform;
    activating the drive assembly to lower the package receiving platform; and manipulating the access panel to cover the opening at a second instance.

2. The method of claim 1 further comprising, after manipulating the access panel at the second instance:
activating the drive assembly to lower the package receiving platform to a second position;
manipulating a door to provide access to a second opening in a wall of a building;
detecting removal of the package from the package receiving platform; and
manipulating the door to cover the second opening.

3. The method of claim 1 wherein manipulating the access panel at the first instance includes sliding the access panel in and out of the housing disposed on the roof to selectively provide access to the opening.

4. The method of claim 1 wherein manipulating the access panel at the first instance includes rotating a first door and a second door of the access panel to selectively provide access to the opening.

5. The method of claim 1 wherein activating the drive assembly includes suspending the package receiving platform via the at least one cable coupled at a first end to the lower portion of the package receiving platform and coupled at a second end to the drive assembly positioned in the housing disposed on the roof above the package receiving platform.

6. The method of claim 1 wherein activating the drive assembly includes retracting the at least one cable to raise the package receiving platform to the first position with the package support plate of the package receiving platform extending beyond at least the portion of the roof.

7. The method of claim 1 further comprising, before manipulating the access panel at the first instance:
activating at least one biasing element disposed on the roof to move the incoming package from a first position out of alignment with the opening in the roof to a second position in alignment with the opening in the roof.

8. The method of claim 7 wherein activating the at least one biasing element includes activating a plurality of biasing elements spaced from each other about the opening in the roof with the plurality of biasing elements defining a landing space for the incoming package having an area greater than an area of the opening in the roof.

9. A method, comprising:
receiving an incoming package from a delivery device in a landing space on a roof defined by a plurality of biasing elements proximate an opening in the roof;
determining that the package is out of alignment with the opening in the roof;
activating the plurality of biasing elements in response to the determination of the package being out of alignment with the opening, including moving the incoming package from the landing space to alignment with the opening in the roof;
activating a drive assembly to raise a package receiving platform to a first position proximate the opening in the roof in response to a determination that the package has been aligned with the opening;
manipulating an access panel coupled to the roof to provide access to the opening at a first instance;
receiving the package on the package receiving platform;
activating the drive assembly to lower the package receiving platform; and
manipulating the access panel to cover the opening at a second instance.

10. The method of claim 9 further comprising, before receiving the incoming package:
detecting the incoming package from the delivery device; and
authorizing the incoming package.

11. The method of claim 9 wherein manipulating the access panel at the first instance includes sliding the access panel into a housing coupled to the roof to provide access to the opening and wherein manipulating the access panel at the second instance includes sliding the access panel out of the housing to cover the opening at the second instance.

12. The method of claim 9 further comprising, after manipulating the access panel at the second instance:
activating the drive assembly to lower the package receiving platform to a second position;
manipulating a door to provide access to a second opening in a wall of a building;
detecting removal of the package from the package receiving platform; and
manipulating the door to cover the second opening.

13. The method of claim 12 further comprising, after manipulating the door to provide access to the second opening:
activating a second biasing element to push the package off the package receiving platform and through the second opening.

14. The method of claim 9 wherein determining that the package is out of alignment with the opening in the roof includes activating a plurality of proximity sensors disposed on the roof between the plurality of biasing elements.

* * * * *